(12) United States Patent
Hosotsubo

(10) Patent No.: US 8,164,776 B2
(45) Date of Patent: Apr. 24, 2012

(54) IMAGE PROCESSING APPARATUS, IMAGE PROCESSING METHOD, AND STORAGE MEDIUM STORING IMAGE PROCESSING PROGRAM

(75) Inventor: Toshihiko Hosotsubo, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 803 days.

(21) Appl. No.: 12/243,205

(22) Filed: Oct. 1, 2008

(65) Prior Publication Data

US 2009/0091789 A1 Apr. 9, 2009

(30) Foreign Application Priority Data

Oct. 4, 2007 (JP) ................... 2007-261017

(51) Int. Cl.
*H04N 1/40* (2006.01)
*G06F 3/12* (2006.01)
*G06K 15/00* (2006.01)
(52) U.S. Cl. ................ 358/1.15; 358/1.16; 358/444
(58) Field of Classification Search .............. 358/400, 358/401, 474, 1.15, 468, 471
See application file for complete search history.

(56) References Cited

U.S. PATENT DOCUMENTS

| 2002/0041384 | A1* | 4/2002 | Moriura et al. | 358/1.9 |
| 2006/0250645 | A1* | 11/2006 | Miyazaki | 358/1.15 |
| 2008/0049251 | A1* | 2/2008 | Shimada | 358/1.15 |
| 2008/0246989 | A1* | 10/2008 | Konuma | 358/1.15 |
| 2008/0297841 | A1* | 12/2008 | Aoki | 358/1.15 |

FOREIGN PATENT DOCUMENTS

| JP | 2001-096863 A | 4/2001 |
| JP | 2007-210237 A | 8/2007 |

* cited by examiner

*Primary Examiner* — Jerome Grant, II
(74) *Attorney, Agent, or Firm* — Canon USA Inc. IP Division

(57) ABSTRACT

An image processing apparatus includes a reading unit, a printing unit, a control unit configured to control a reading job for causing the reading unit to execute reading processing and a printing job for causing the printing unit to execute print processing, and a setting unit configured to perform setting as to whether to permit execution of a second job while a first job is in execution, wherein the first job is one of the reading job and the printing job, and the second job is the other of the reading job and the printing job. The control unit controls the reading job and the printing job based on the setting performed by the setting unit.

15 Claims, 40 Drawing Sheets

FIG.11

| | | |
|---|---|---|
| SOFTWARE SERVICE | COPY SETTING | ¥0 |
| | SCAN SETTING | ¥0 |
| | FAX SETTING | ¥0 |
| | INTERNET | ¥100 |
| | OBTAIN PRINT DATA FROM NETWORK | ¥100 |
| | RIP OF PRINT DATA | ¥0 |
| | CHECK CONSUMABLES | ¥0 |
| | MAIL | ¥100 |
| | USB | ¥50 |
| HARDWARE SERVICE | BLACK-AND-WHITE COPY | ¥10 |
| | COLOR COPY | ¥30 |
| | RECEIVE FAX | ¥30 |
| | SEND FAX | ¥30 |
| | BLACK-AND-WHITE PRINT | ¥10 |
| | COLOR PRINT | ¥30 |

FIG.37

|  | SCAN | PRINT | COPY |
|---|---|---|---|
| USER A | ○ | ○ | ○ |
| USER B | × | ○ | ○ |
| USER C | ○ | × | × |
| USER D | × | × | × |

IMAGE PROCESSING APPARATUS, IMAGE PROCESSING METHOD, AND STORAGE MEDIUM STORING IMAGE PROCESSING PROGRAM

BACKGROUND OF THE INVENTION

1. Field of the Invention

The present invention relates to an image processing apparatus, an image processing method, and a storage medium storing an image processing program.

2. Description of the Related Art

A multifunction peripheral has a reading (scan) function for reading (scanning) a document and inputting image data as well as a printing function for executing print processing based on the input image data.

Most multifunction peripherals are configured so that the reading function and the printing function can be performed simultaneously. For example, the multifunction peripheral can start printing image data while reading a document and can start reading a document while printing image data.

Nowadays, such multifunction peripherals are installed in environment such as stores and used by an unspecified number of users as well as offices where they are used by a closed user group.

However, when a multifunction peripheral, which is configured so that each function can be used simultaneously, is installed in an environment such as stores to be used by an unspecified number of users, this may entail inconvenience for some users. For example, when a first user is using the reading function, if a second user uses the printing function without permission, the second user would be interrupting the workflow of the first user. Further, the first user may have his work peeped at by the second user when the second user collects the print product.

In such a case, the multifunction peripheral can be set to inhibit each function from being used simultaneously without exception. However, when the multifunction peripheral is set as such, individual setting for each job cannot be made.

SUMMARY OF THE INVENTION

An embodiment of the present invention is directed to an image processing apparatus capable of setting whether to permit execution of a subsequent job while a preceding job is in execution in a case where a reading job and a printing job are continuously executed, an image processing method, and a storage medium storing an image processing program.

According to an aspect of the present invention, an image processing apparatus includes a reading unit configured to input image data by executing reading processing for reading a document, a printing unit configured to execute print processing based on image data, a control unit configured to control a reading job for causing the reading unit to execute the reading processing and a printing job for causing the printing unit to execute the print processing, and a setting unit configured to perform setting as to whether to permit execution of a second job while a first job is in execution. The first job is one of the reading job and the printing job, and the second job is the other of the reading job and the printing job. When the second job is input while the first job is in execution, the control unit is configured to enable execution of the second job while the first job is in execution if the setting unit performs the setting to permit execution of the second job while the first job is in execution.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 illustrates a service charge table according to the first exemplary embodiment of the present invention.

FIG. 37 is a table illustrating user information and permission setting according to the fourth exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
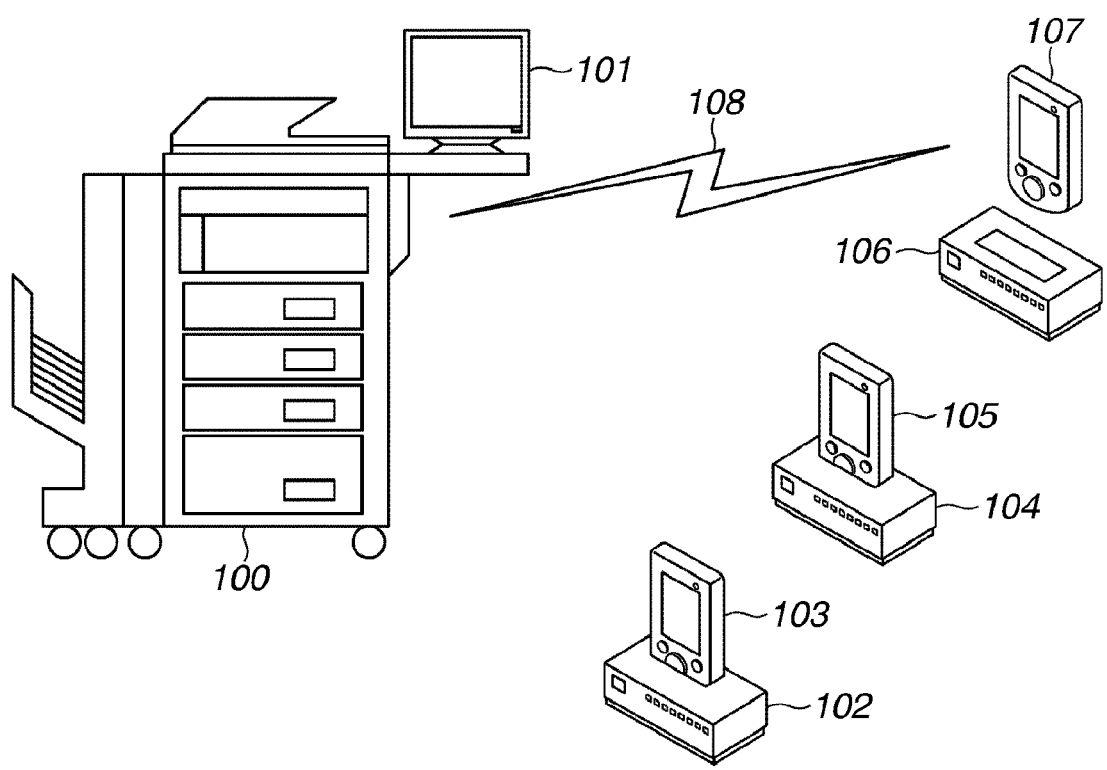
FIG. 1 illustrates a configuration of a printing system according to a first exemplary embodiment of the present invention.

FIG. 1 illustrates a configuration of a printing system according to a first exemplary embodiment of the present invention. A (multifunction peripheral) MFP 100 serves as an image processing apparatus. A main UI terminal 101 and auxiliary UI terminals 103, 105, and 107 for the MFP 100 are provided in the printing system. Cradles 102, 104, 106 are used for charging each of the auxiliary UI terminals 103, 105, and 107. A wireless communication link 108 can be used when the MFP 100 communicates with the auxiliary UI terminal 107, which can be removed from the cradle 106.

Figure 2:
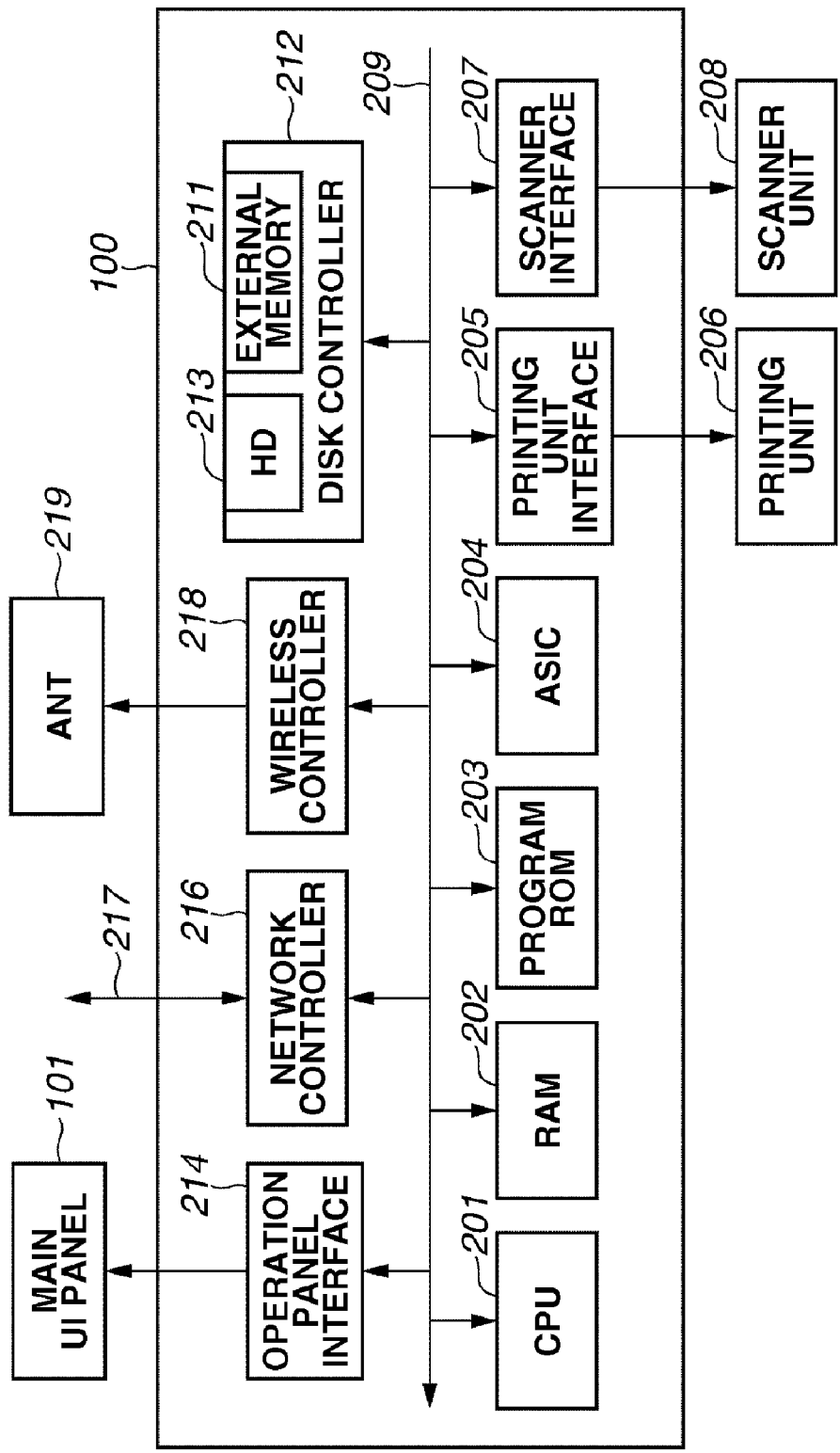
FIG. 2 is a block diagram illustrating a configuration of a multifunction peripheral (MFP) according to an exemplary embodiment of the present invention.

FIG. 2 is a block diagram illustrating a configuration of the MFP 100. A central processing unit (CPU) 201 controls various types of devices connected to a system bus 209 by reading out a control program stored in a program read-only memory (ROM) 203, a hard disk (HD) 213, or an external memory 211, loading it to a random access memory (RAM) 202, and executing it. According to this control program, the CPU 201 controls various jobs of the MFP 100. The RAM 202 is a storage area that functions as a main memory and a work area of the CPU 201. Further, the RAM 202 is configured such that its memory capacity can be increased by an optional RAM which is connected to an expansion port (not shown). The ROM 203 is a program ROM for storing the control program. An application-specific integrated circuit (ASIC) 204 includes a control circuit for running memory controllers of the RAM 202 and the ROM 203, a direct memory access (DMA) controller, and an interface controller. Access to the HD 213 and the external memory 211 is controlled by the ASIC 204.

A printing unit 206 receives image data from the RAM 202 via a printing unit interface 205 and prints the image. A scanner unit 208 reads a document and sends image data to the RAM 202 via a scanner interface 207. A disk controller (DKC) 212 controls access to the external memory 211 and the HD 213. The external memory 211, such as a universal serial bus (USB) memory or an IC card, is used as an optional memory. The HD 213 stores various types of information including the control program as well as user information and print data.

An operation panel interface 214 is used for outputting information which is input into the main UI terminal 101 to other components. A network controller (NC) 216 is connected to a network via a predetermined network interface 217 and controls communication with a different network apparatus. A wireless controller 218 is used for wireless communication with a different apparatus via an antenna 219. The wireless communication is performed according to, for example, Bluetooth or wireless LAN conforming to IEEE 802.11a/b/g.

Figure 3:
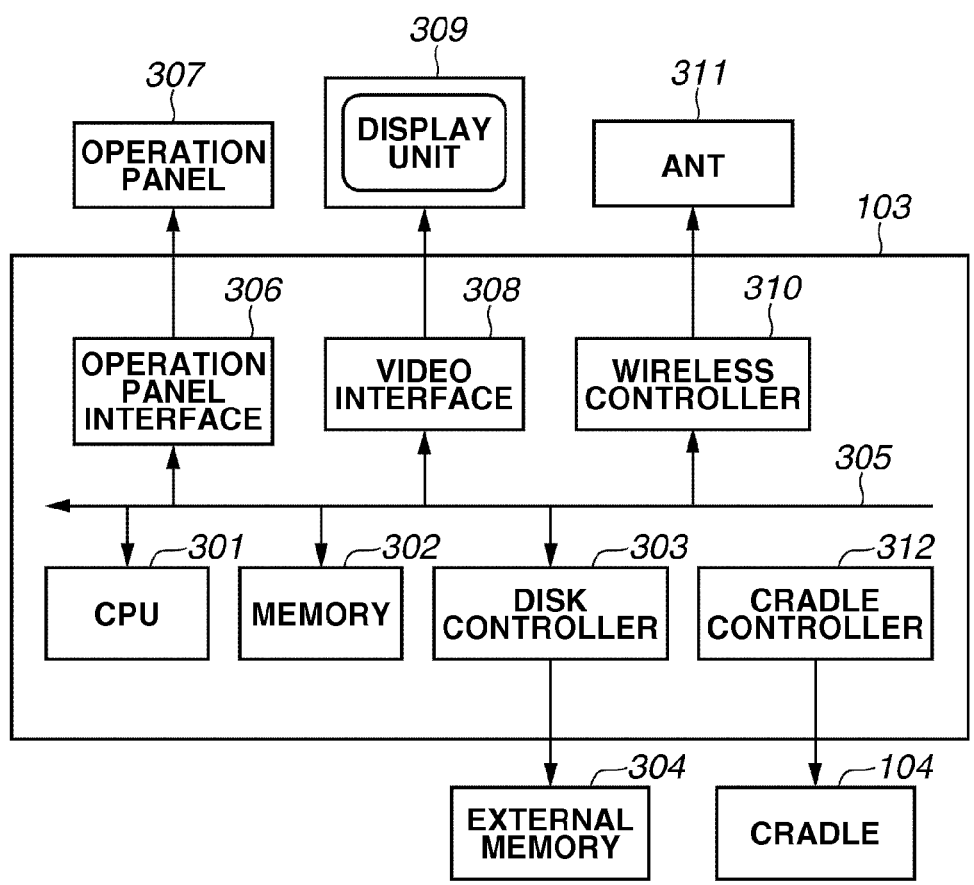
FIG. 3 is a block diagram illustrating a configuration of an auxiliary user interface (UI) terminal according to the first exemplary embodiment of the present invention.

FIG. 3 is a block diagram illustrating a configuration of the auxiliary UI terminal 103. A CPU 301 controls various types of devices connected to a system bus 305 based on a control program stored in a memory 302. The memory 302 includes, for example, a RAM or a ROM. A disk controller (DKC) 303 is configured to control access to an external memory 304. The external memory 304, which is, for example, a USB memory or an IC card, is connected to the DKC 303 as an optional memory.

The system bus 305 is used for transferring data to and from various types of devices which are connected. An operation panel interface 306 is used for sending information input from an operation panel 307 to a different component via the system bus 305. A video interface 308 is configured to receive information which is to be output to a display unit 309 via the system bus 305 from a different component and controls the process. A wireless controller 310 is used for wireless communication with a different apparatus via an antenna (ANT) 311. A cradle controller 312 is configured to connect the auxiliary UI terminal 103 with the cradle 104 and provides power to the apparatus by a battery charger (not shown). The auxiliary UI terminals 105 and 107 have a configuration similar to the auxiliary UI terminal 103.

Figure 4:
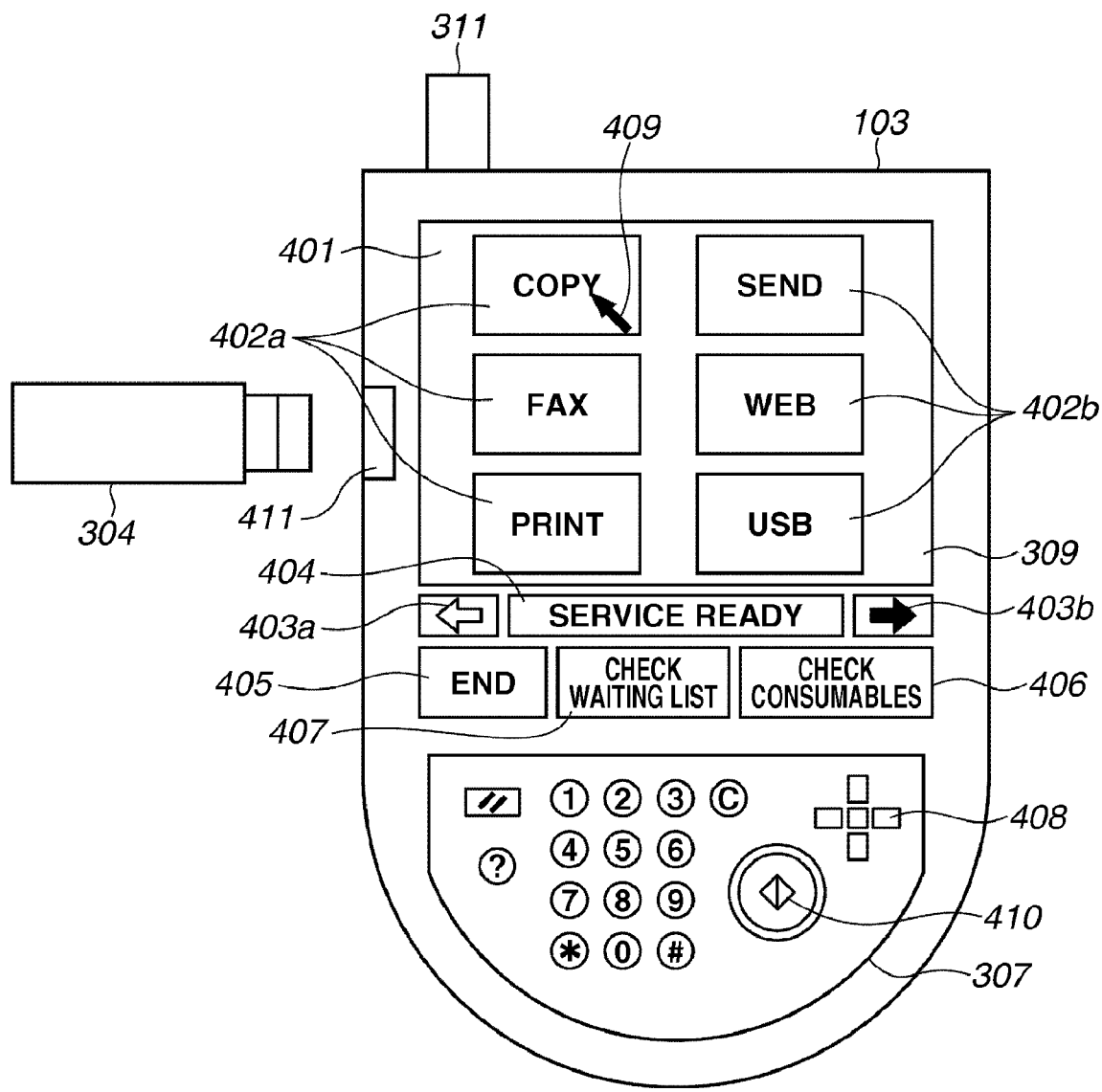
FIG. 4 illustrates an appearance of the auxiliary UI terminal according to the first exemplary embodiment of the present invention.

FIG. 4 illustrates an appearance of the auxiliary UI terminal 103. The display unit 309 displays a user interface via which the MFP can be operated. A display screen 401 displays operation menus and operation items. Operation menu items 402a and 402b are displayed on the display screen 401. The menu items include copy, FAX, print, send, web access, and USB storage access. The operation menu has a hierarchical design. If one of the operation menu items is selected, the display screen is switched to an operation screen of the selected menu item. Scroll buttons 403a and 403b are used for scrolling menu items which are to be displayed.

A status bar 404 is configured to display a state of the auxiliary UI terminal 103. The status bar 404 in FIG. 4 is in a service waiting state. An end button 405 is used for ending a service via the auxiliary UI terminal 103. A consumables check button 406 is used for displaying a status of consumables. A waiting list check button 407 is used for displaying the waiting list for the hardware service. An arrow key 408 is used for operating a cursor 409. The cursor 409 is used for selecting a menu item. A select button 410 is used for entering the menu item pointed by the cursor 409. A slot 411 is a slot into which the external memory 304, such as a USB memory, can be inserted.

Next, operation according to the first exemplary embodiment of the present invention will be described. According to the present embodiment, when a user makes a request for service of some kind, the MFP creates a job corresponding to the service and manages the job. It is to be noted that the hardware service of the services concerning the present embodiment includes copying, scanning, and printing, which use the reading function and the printing function of the MFP. In using the hardware service, the user needs to go to the MFP 100 to obtain a result of the execution. Further, the software service of the services concerning the present embodiment includes access to network and confirmation of the status of the MFP, which do not use the reading function or the printing function of the MFP. In using the software service, the user does not need to go to the MFP 100 to obtain a result of the execution.

Figure 5:
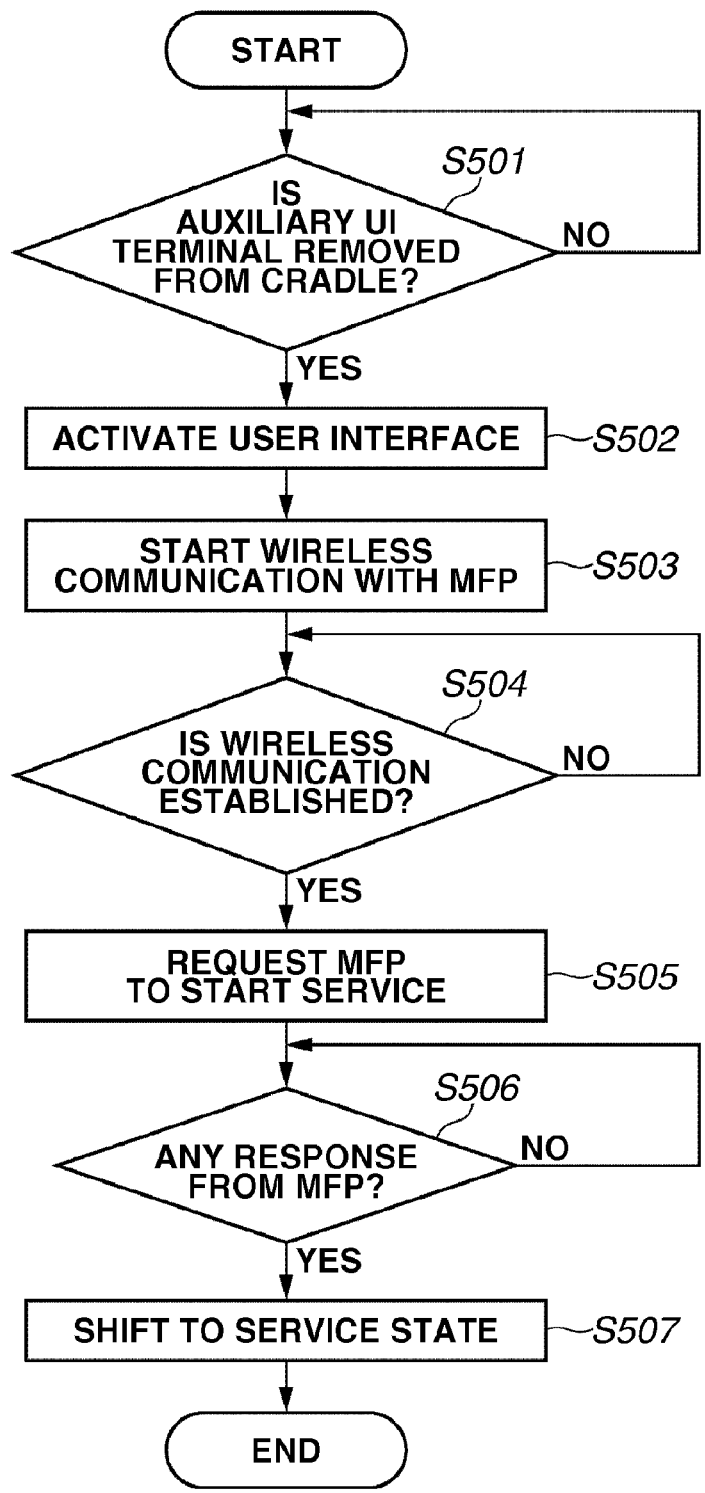
FIG. 5 is a flowchart illustrating an operation of the auxiliary UI terminal when a service is started according to the first exemplary embodiment of the present invention.

FIG. 5 is a flowchart illustrating an operation of the auxiliary UI terminal 103 when a service is started. This operation is realized when the CPU 301 reads and executes a program stored in the memory 302. First, in step S501, the CPU 301 determines whether the auxiliary UI terminal 103 has been removed from the cradle 104 via the cradle controller 312. If the CPU 301 determines that the auxiliary UI terminal 103 has been removed from the cradle 104 (YES in step S501), then in step S502, the CPU 301 activates a user interface. Then, a user interface such as the one displayed on the display screen 401 of the display unit 309 in FIG. 4 is displayed. Then, a message indicating that the auxiliary UI terminal 103 is being initialized is displayed on the status bar 404.

In step S503, the CPU 301 starts wireless communication with the MFP 100 via the wireless controller 310. Then, a message indicating that the auxiliary UI terminal 103 is in communication is displayed on the status bar 404. In step S504, the CPU 301 determines whether the auxiliary UI terminal 103 has established wireless communication with the MFP 100. If the CPU 301 determines that the auxiliary UI terminal 103 has established wireless communication with the MFP 100 (YES in step S504), then in step S505, the CPU 301 requests the MFP 100 to start a service such as copying, scanning, or printing. At this time, the CPU 301 can set whether to permit parallel processing of a subsequent job using a hardware resource not used by a preceding job. Details of this setting will be described below referring to FIGS. 29 through 38. Next, in step S506, the CPU 301 determines whether the MFP 100 has sent any response to the request. If the CPU 301 determines that the MFP 100 has responded to the request (YES in step S506), then the process proceeds to step S507. In step S507, the CPU 301 shifts the state of the auxiliary UI terminal 103 into a service state where an operation by the user can be received. At this time, a message indicating that the auxiliary UI terminal 103 is in a service state is displayed on the status bar 404.

Figure 6:
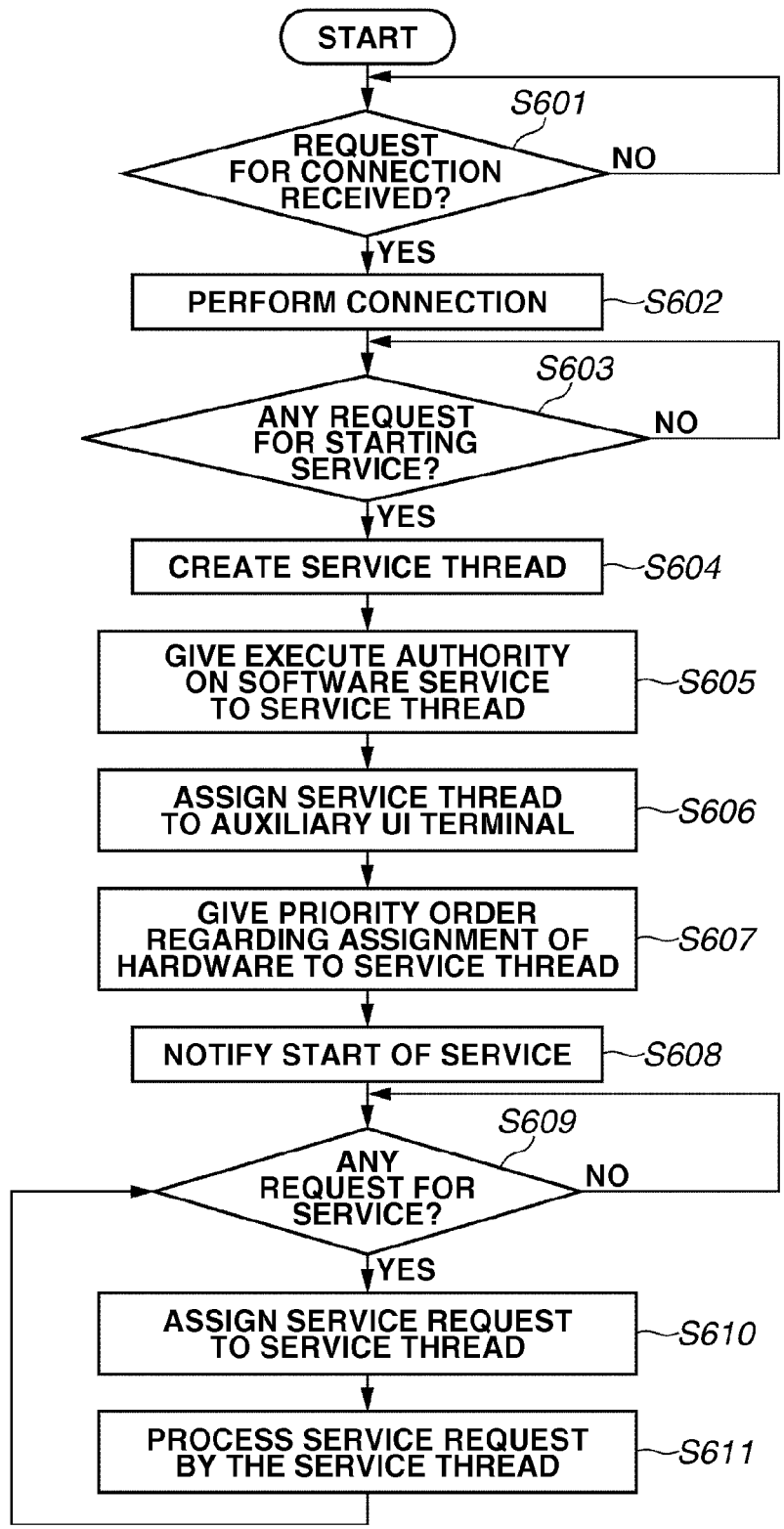
FIG. 6 is a flowchart illustrating an operation of the MFP when the MFP receives a service start request from the auxiliary UI terminal according to the first exemplary embodiment of the present invention.

FIG. 6 is a flowchart illustrating an operation of the MFP 100 when the service is started. This operation is realized when the CPU 201 reads and executes a program stored in the RAM 202. In step S601, the CPU 201 determines whether a request for establishing wireless communication link from the auxiliary UI terminal via the antenna 219 and the wireless controller 218 has been received. If the CPU 201 determines that the request has been received (YES in step S601), then in step S602, the CPU 201 establishes a wireless communication link between the MFP 100 and the auxiliary UI terminal. In step S603, the CPU 201 waits until a request for starting service such as copying, scanning, or printing is sent from the auxiliary UI terminal.

If the CPU 201 determines that any request for starting service has been received (YES in step S603), then in step S604, the CPU 201 creates a new service thread in the RAM 202. In step S605, the CPU 201 gives a software service execute authority to the service thread. In step S606, the CPU 201 assigns the service thread to the auxiliary UI terminal. Next, in step S607, the CPU 201 gives the service thread, which is assigned to the auxiliary UI terminal, data on priority order regarding assignment of the hardware service. At this time, if service threads which are assigned to different auxiliary UI terminals already exist in the RAM 202, the service thread of the auxiliary UI terminal will be added to the bottom of the priority order of all service threads. At this time, the CPU 201 can set whether to permit parallel processing of a subsequent job using a hardware resource not used by a preceding job. Details of this setting will be described below referring to FIGS. 29 through 38.

In step S608, the CPU 201 notifies the auxiliary UI terminal that the service is started. Next, in step S609, the CPU 201 waits until it receives a service request from the auxiliary UI terminal. If the CPU 201 determines that the service request has been sent from the auxiliary UI terminal (YES in step S609), then the process proceeds to step S610. In step S610, the CPU 201 assigns processing of the service to the service thread which corresponds to the auxiliary UI terminal. In step S611, the CPU 201 processes the requested service in units of service thread.

Figure 7:
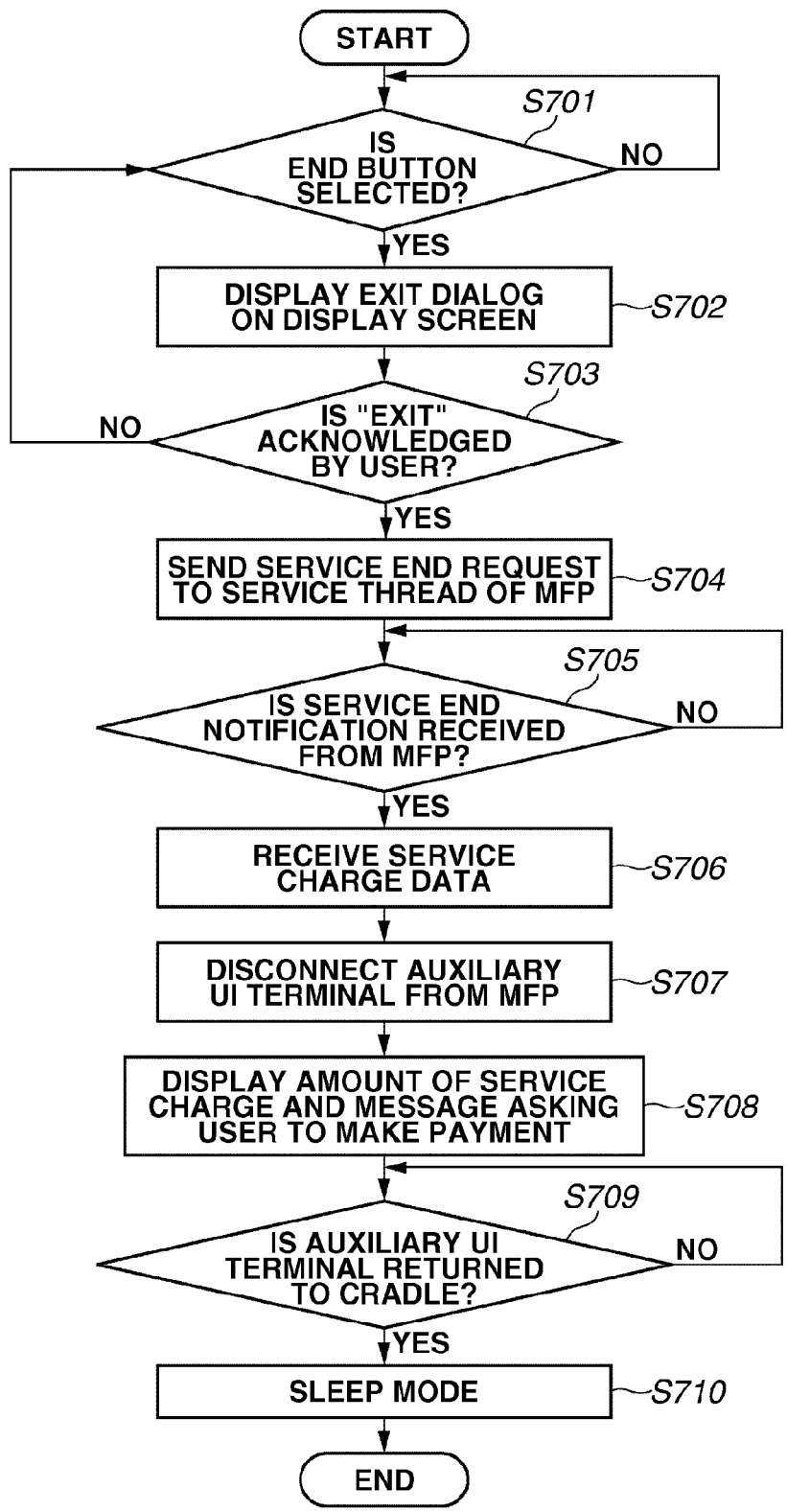
FIG. 7 is a flowchart illustrating an operation of the auxiliary UI terminal at the end of service according to the first exemplary embodiment of the present invention.
Figure 9:
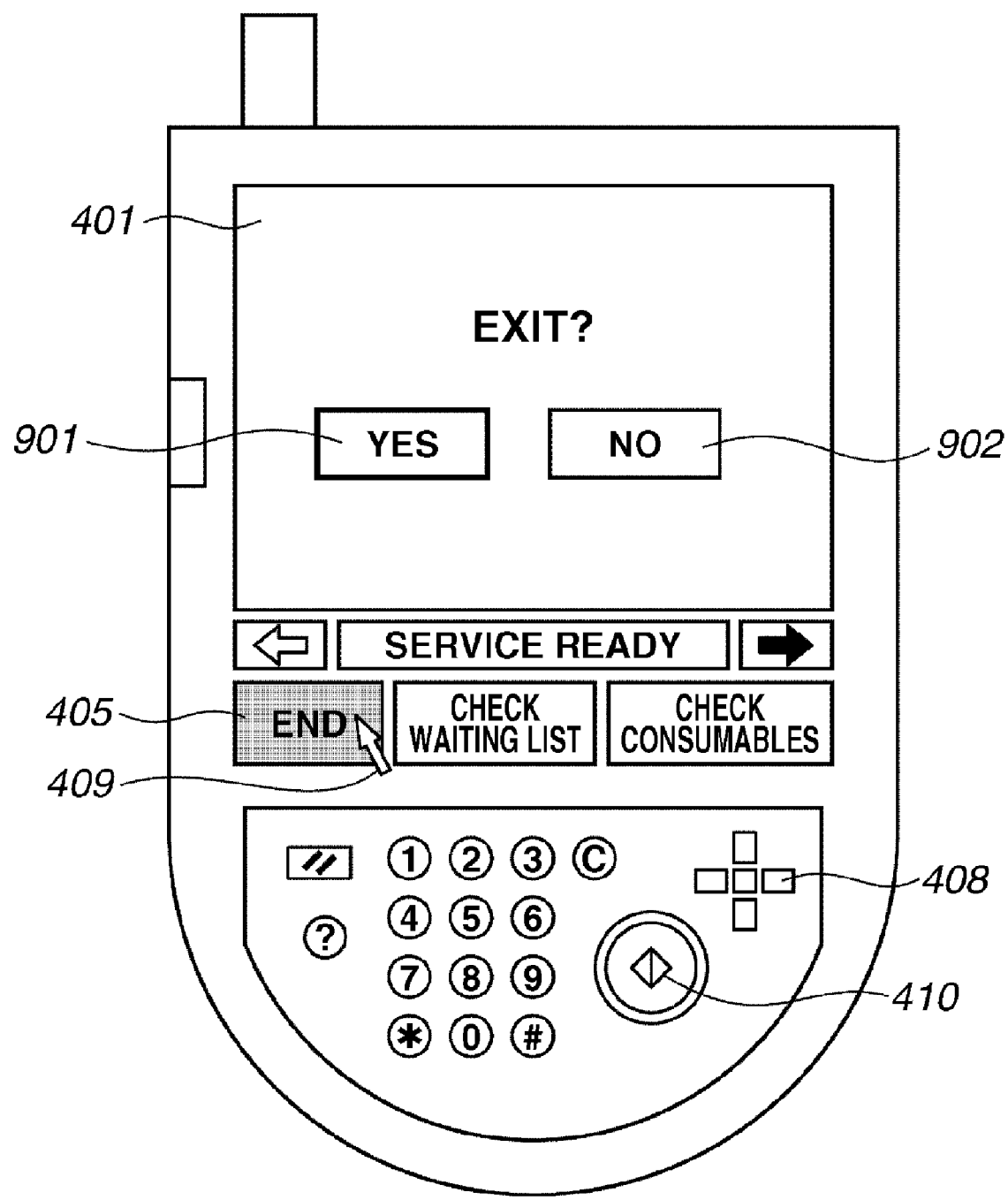
FIG. 9 illustrates an exit dialog displayed by the auxiliary UI terminal according to the first exemplary embodiment of the present invention.

FIG. 7 is a flowchart illustrating an operation of the auxiliary UI terminal 103 when the service is ended. This operation is realized when the CPU 301 reads and executes a program stored in the memory 302. First, in step S701, the CPU 301 of the auxiliary UI terminal 103 determines whether the user has selected the end button 405 using the arrow key 408 and the select button 410. If the CPU 301 determines that the end button 405 has been selected (YES in step S701), then in step S702, the CPU 301 displays an exit dialog on the display screen 401 such as the one illustrated in FIG. 9. In step S703, the CPU 301 determines whether ending the service is acknowledged by the user. If the CPU 301 determines that a YES button 901 is selected (YES in step S703), then in step S704, the CPU 301 sends out a service end request to the service thread of the MFP 100. At this time, a message indicating that the service is going to end is displayed on the status bar 404. On the other hand, if the CPU 301 determines that a NO button 902 is selected (NO in step S703), then the auxiliary UI terminal 103 is returned to the state before the end button 405 has been pressed in step S701.

Figure 10:
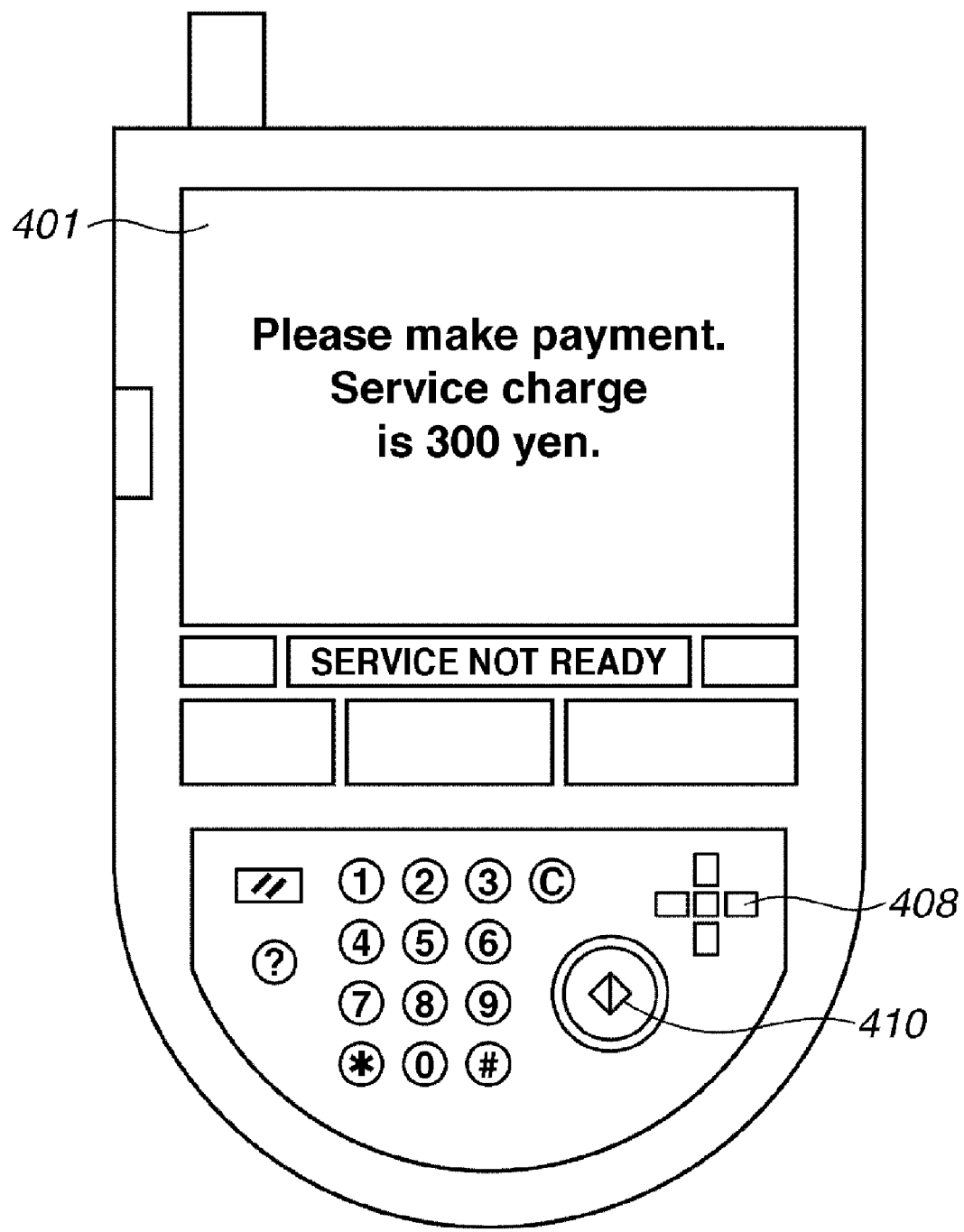
FIG. 10 illustrates service charge and payment reminder message displayed by the auxiliary UI terminal according to the first exemplary embodiment of the present invention.

In step S705, the CPU 301 waits until a service end notification is sent from the MFP 100. At this time, a message indicating that the service is ending is displayed on the status bar 404. If the CPU 301 receives the service end notification from the MFP 100 (YES in step S705), then in step S706, the CPU 301 receives data on service charge. Next, in step S707, the CPU 301 ends the wireless communication with the MFP 100. In step S708, the CPU 301 displays the amount of service charge received from the MFP 100 and a message asking the user to make payment on the display screen 401 as illustrated in FIG. 10. At this time, a message indicating that the service is not available is displayed on the status bar 404.

In step S709, the CPU 301 waits until the auxiliary UI terminal 103 is returned to the cradle 102. If the CPU 301 determines that the auxiliary UI terminal 103 is returned to the cradle 102 via the cradle controller 312 (YES in step S709), the process proceeds to step S710. In step S710, the CPU 301 sets the display screen 401 to non-display state and comes into a sleep mode.

Figure 8:
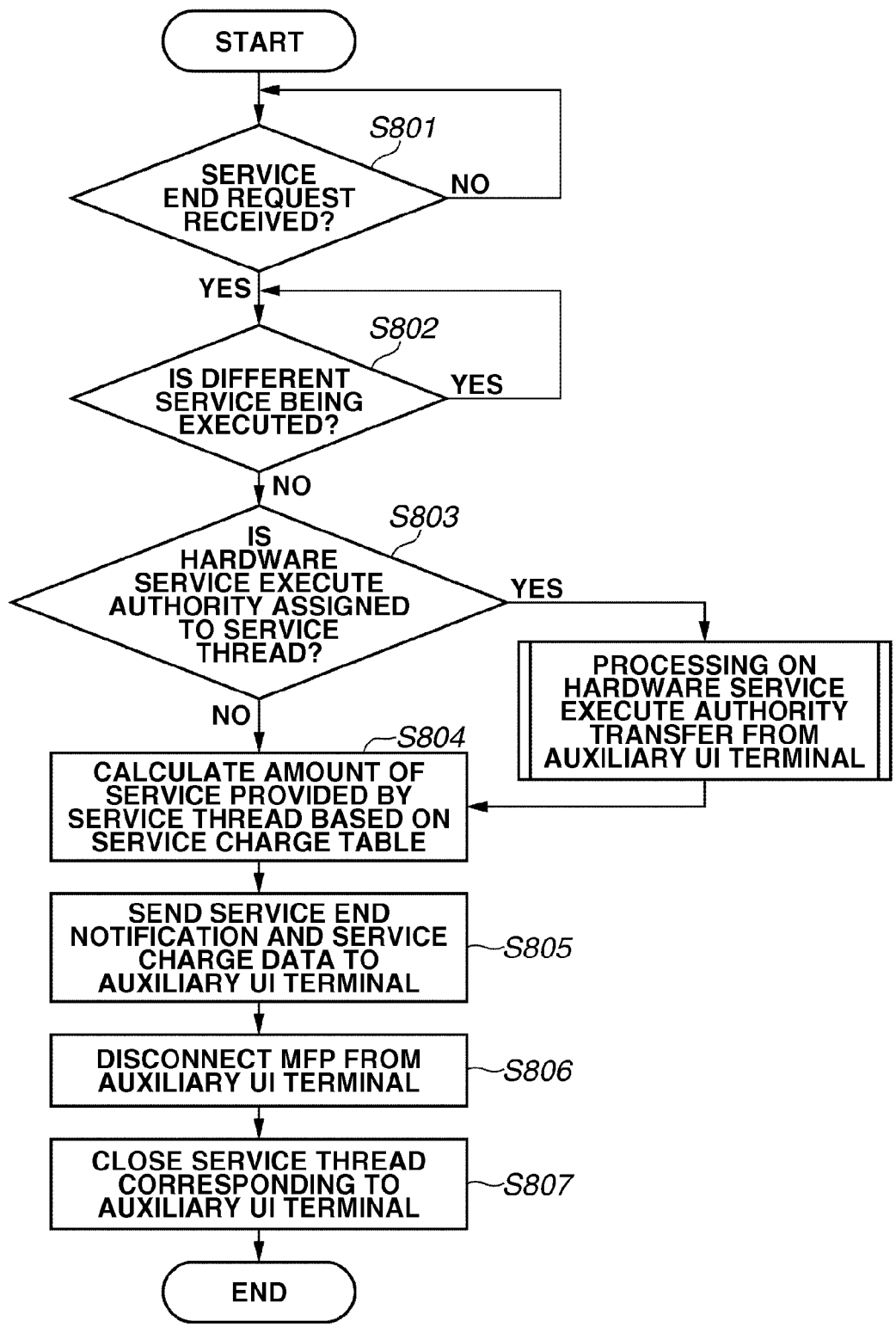
FIG. 8 is a flowchart illustrating an operation of the MFP when it receives a service end request from the auxiliary UI terminal according to the first exemplary embodiment of the present invention.

FIG. 8 is a flowchart illustrating an operation of the MFP 100 when the service is ended. This operation is realized when the CPU 201 reads and executes a program stored in the RAM 202. In step S801, the CPU 201 receives a service end request from one of the auxiliary UI terminals. If the CPU 201 determines that the service end request has been received (YES in step S801), then the process proceeds to step S802. In step S802, if the service thread corresponding to the auxiliary UI terminal is in execution of a different service, the CPU 201 waits until the service ends. If the CPU 201 determines that the service thread has ended (NO in step S802), then the process proceeds to step S803.

In step S803, the CPU 201 checks the service thread to determine whether a hardware service execute authority is assigned to the service thread. If the CPU 201 determines that a hardware service execute authority is assigned to the service thread (YES in step S803), then the CPU 201 executes processing on the hardware service execute authority transfer from the auxiliary UI terminal to the MFP 100, which will be described below. Then the process proceeds to step S804. If the CPU 201 determines that the hardware service execute authority is not assigned to the service thread (NO in step S803), the process proceeds to step S804. In step S804, the CPU 201 calculates the amount of service provided by the service thread. The calculation of the amount of service is based on a service charge table stored in the HD 213. An example of the service charge table is illustrated in FIG. 11. The CPU 201 calculates the service charge by checking a service history, which is stored in the RAM 202 as data on the service thread, with reference to the above-described service charge table.

In step S805, the CPU 201 sends the data on the calculated amount of service to the auxiliary UI terminal via the wireless controller 310 together with the service end notification. In step S806, the CPU 201 disconnects the MFP 100 from the auxiliary UI terminal. In step S807, the CPU 201 ends the service thread corresponding to the auxiliary UI terminal and deletes the data from the RAM 202.

Figure 12:
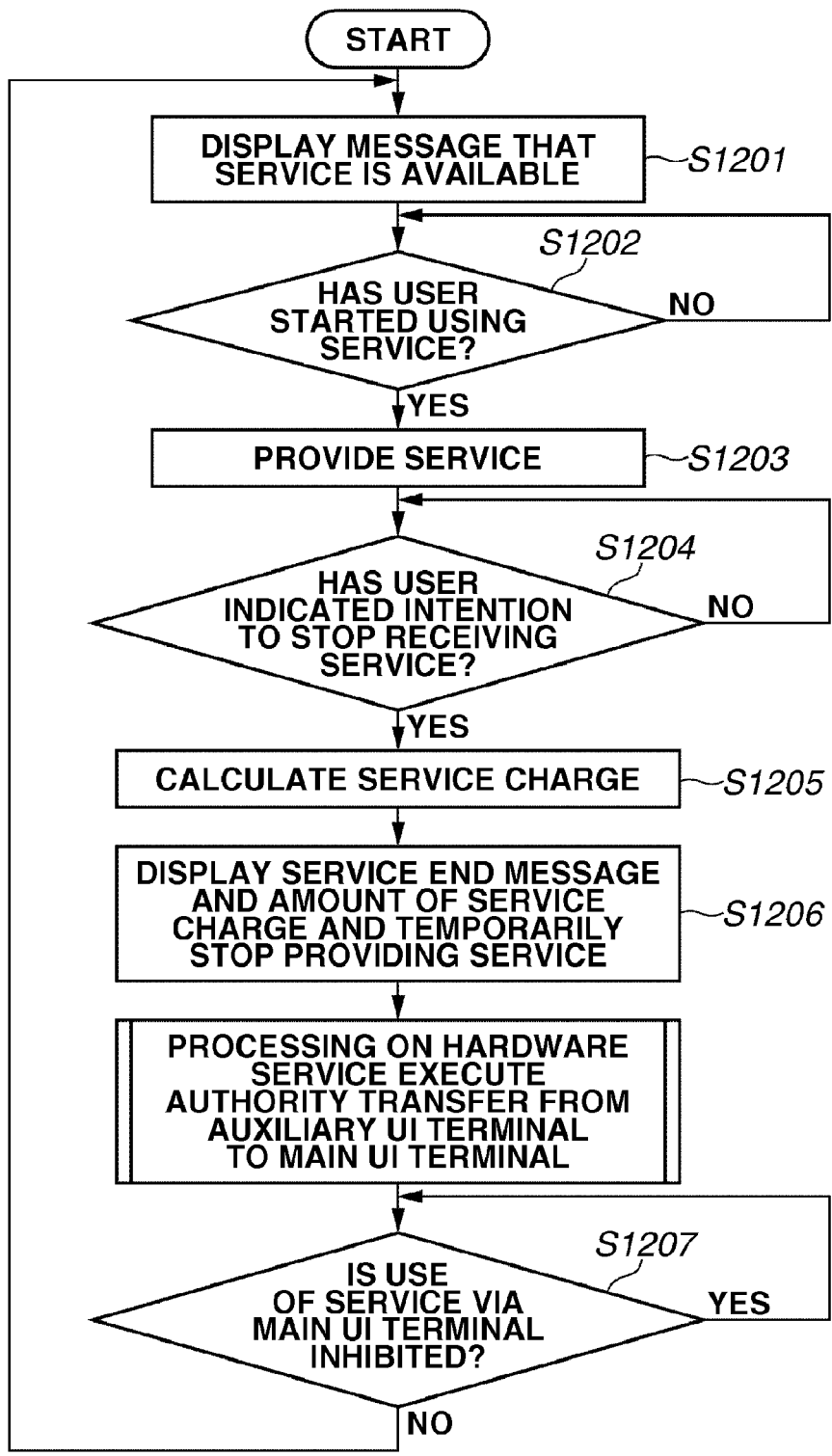
FIG. 12 is a flowchart illustrating an operation of a main UI terminal of the MFP according to the first exemplary embodiment of the present invention.
Figure 13:
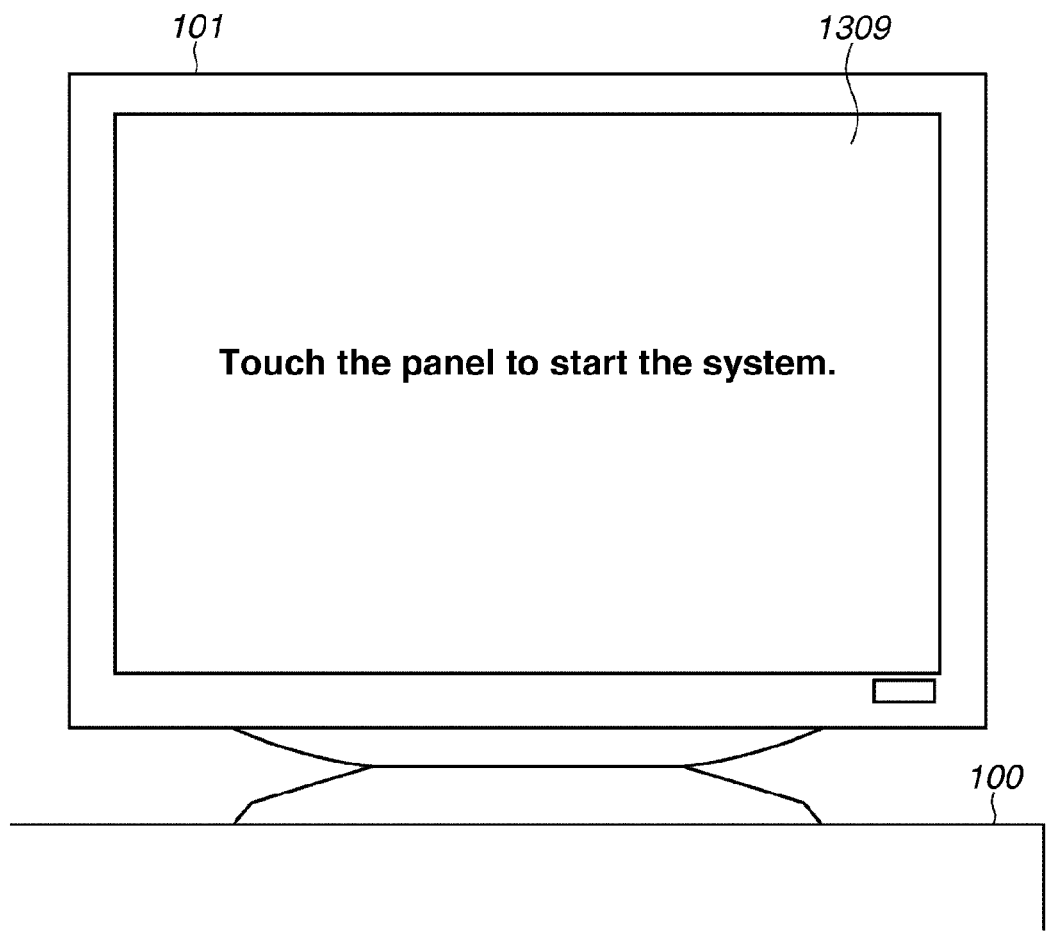
FIG. 13 illustrates the main UI terminal of the MFP when provision of a service can be started according to the first exemplary embodiment of the present invention.

FIG. 12 is a flowchart illustrating an operation of the main UI terminal 101 of the MFP 100. This operation is realized when the CPU 201 reads and executes a program stored in the RAM 202. In step S1201, the CPU 201 displays the user interface on the display of the main UI terminal 101 indicating that the service can be started. FIG. 13 illustrates the main UI terminal 101 in a state where it can start providing the service. In FIG. 13, a message is displayed on a touch panel unit 1309.

Figure 14:
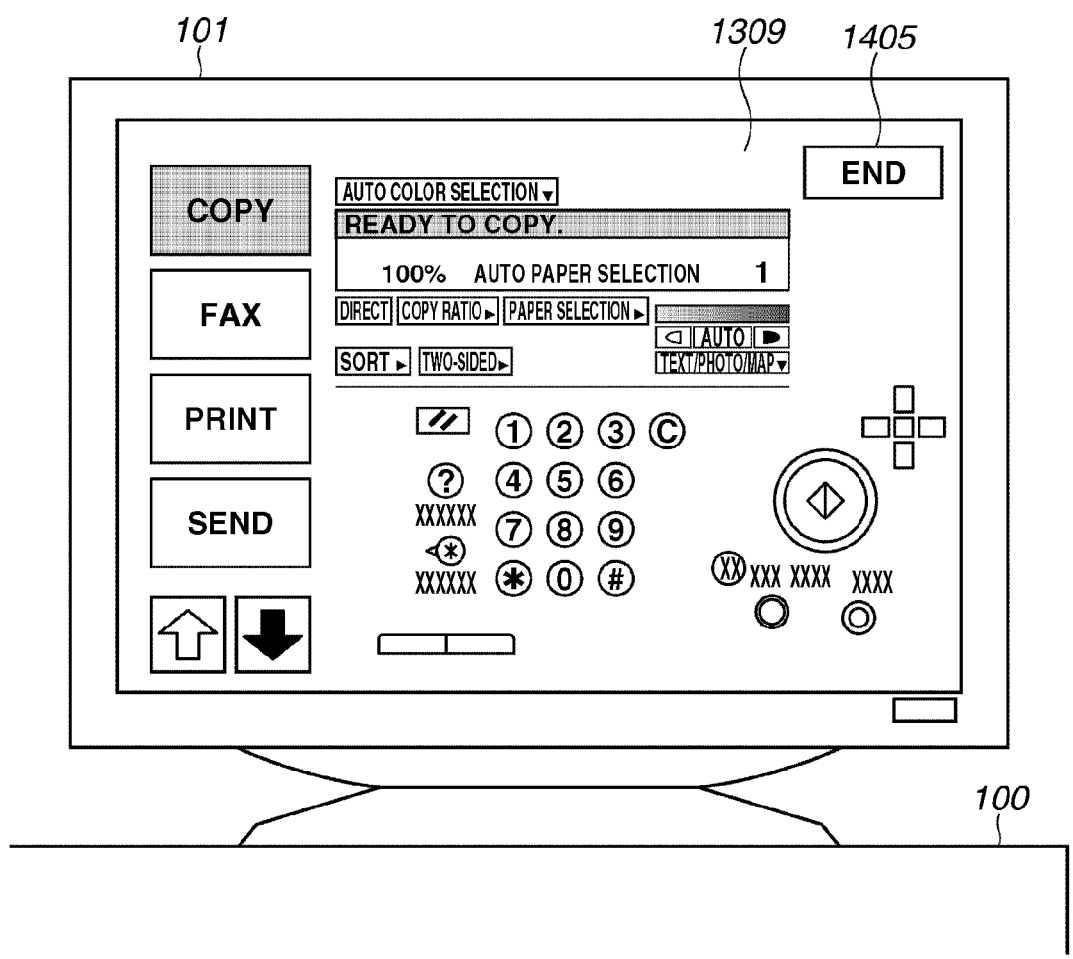
FIG. 14 illustrates the main UI terminal of the MFP when the MFP is in a service provision state according to the first exemplary embodiment of the present invention.

In step S1202, the CPU 201 determines whether the user has touched the touch panel unit 1309 and started the service when the main UI terminal 101 is in a state where it can start providing the service as illustrated in FIG. 13. If the CPU 201 determines that the user has touched the panel to start the service (YES in step S1202), then in step S1203, the main UI terminal 101 is shifted into a service provision state and the service is provided. FIG. 14 illustrates the main UI terminal 101 in the service provision state. In FIG. 14, a user interface such as a touch button used for operating various services, which are provided by the MFP 100, is provided on the touch panel unit 1309. When the main UI terminal 101 is in the service provision state, the user can use all services provided by the MFP 100 including the hardware service and the software service. Next, in step S1204, if the CPU 201 determines that the user has touched an end button 1405 on the touch panel unit 1309 illustrated in FIG. 14 (YES in step S1204), then the provision of the service ends and the process proceeds to step S1205. In step S1205, the CPU 201 calculates a total amount of service which is provided to the user based on the service charge table which is stored in the HD 213 and illustrated in FIG. 11.

Figure 15:
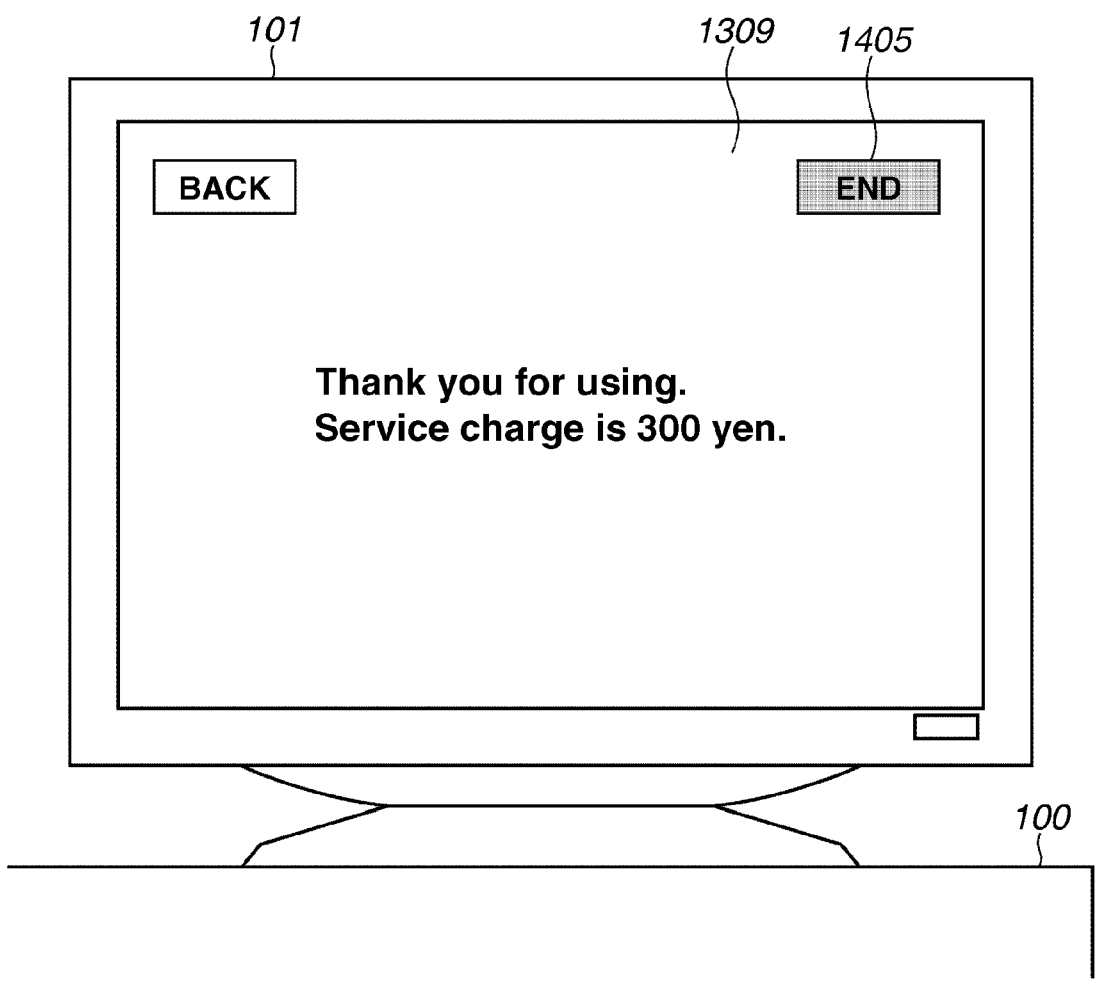
FIG. 15 illustrates the main UI terminal of the MFP at the end of service provision according to the first exemplary embodiment of the present invention.

In step S1206, the CPU 201 displays the calculated amount of service on the touch panel unit 1309 together with the service end message illustrated in FIG. 15, and temporarily stops providing the service. After the provision of the service is stopped, the CPU 201 of the MFP 100 executes processing on the hardware service execute authority transfer from the main UI terminal 101 to the auxiliary UI terminal, which is described below. Next, in step S1207, if the use of the service via the main UI terminal 101 is inhibited according to the processing on the hardware service execute authority transfer from the main UI terminal 101 to the auxiliary UI terminal, the CPU 201 waits until the inhibition state is canceled. If the CPU 201 determines that the use of the service via the main UI terminal 101 is no longer inhibited (NO in step S1207), the process returns to step S1201.

Figure 16:
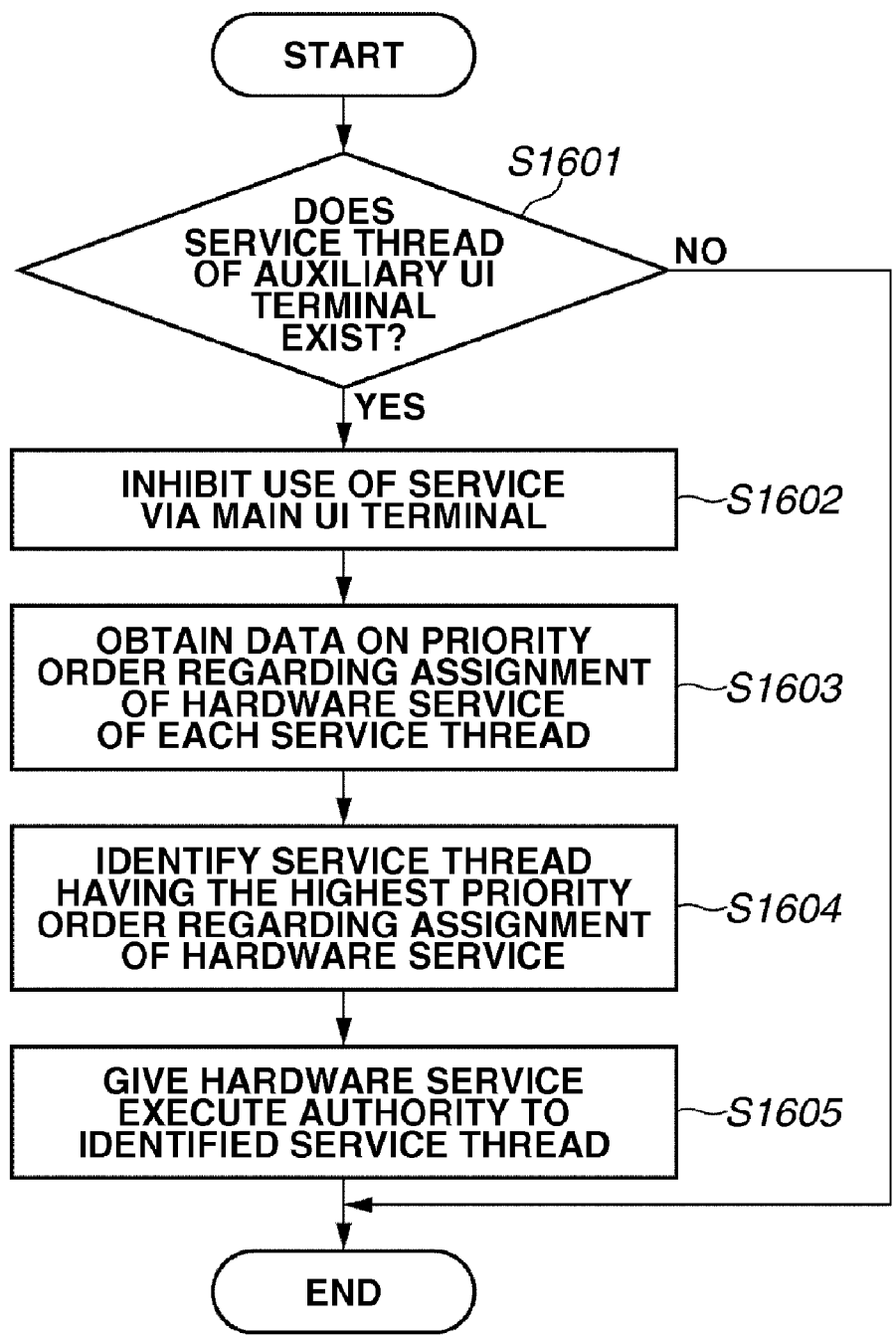
FIG. 16 is a flowchart illustrating processing of hardware service execute authority transfer from the main UI terminal to the auxiliary UI terminal according to the first exemplary embodiment of the present invention.

FIG. 16 is a flowchart illustrating processing of hardware service execute authority transfer from the main UI terminal 101 to the auxiliary UI terminal according to the present embodiment. This operation is realized when the CPU 201 reads and executes a program stored in the RAM 202. In step S1601, if the main UI terminal 101 of the MFP 100 temporarily stops providing the service as described in step S1206 in FIG. 12, then the CPU 201 of the MFP 100 checks whether the service thread of the auxiliary UI terminal exists in the RAM 202. If the CPU 201 determines that the service thread assigned to the auxiliary UI terminal does not exist in the RAM 202 (NO in step S1601), the process ends. On the other hand, if the CPU 201 determines that the service thread assigned to the auxiliary UI terminal exists in the RAM 202 (YES in step S1601), the process proceeds to step S1602. In step S1602, the CPU 201 inhibits the use of service by the user via the main UI terminal 101.

Figure 17:
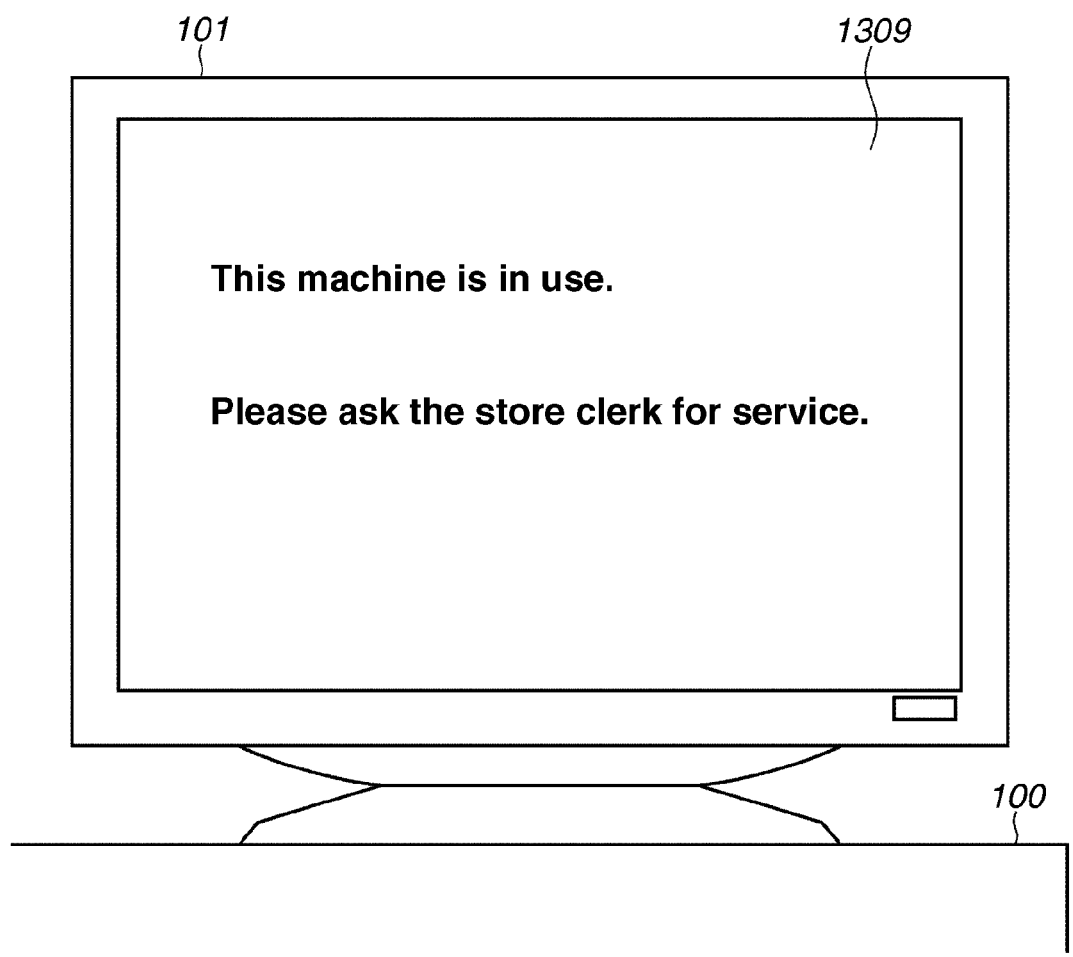
FIG. 17 illustrates the main UI terminal of the MFP in a state where use of the service is inhibited according to the first exemplary embodiment of the present invention.

FIG. 17 illustrates the main UI terminal 101 in a state where the use of the service is inhibited. In this state, touch buttons are not displayed on the screen. In step S1603, the CPU 201 obtains data on priority order regarding assignment of the hardware service of each service thread assigned to the auxiliary UI terminal. In step S1604, the CPU 201 identifies the service thread having the highest priority order. In step S1605, the CPU 201 gives the hardware service execute authority to the identified service thread, and then the process ends. At this time, the CPU 201 can set whether to permit parallel processing of a subsequent job using a hardware resource not used by a preceding job. Details of this setting will be described below referring to FIGS. 29 through 38.

Figure 18:
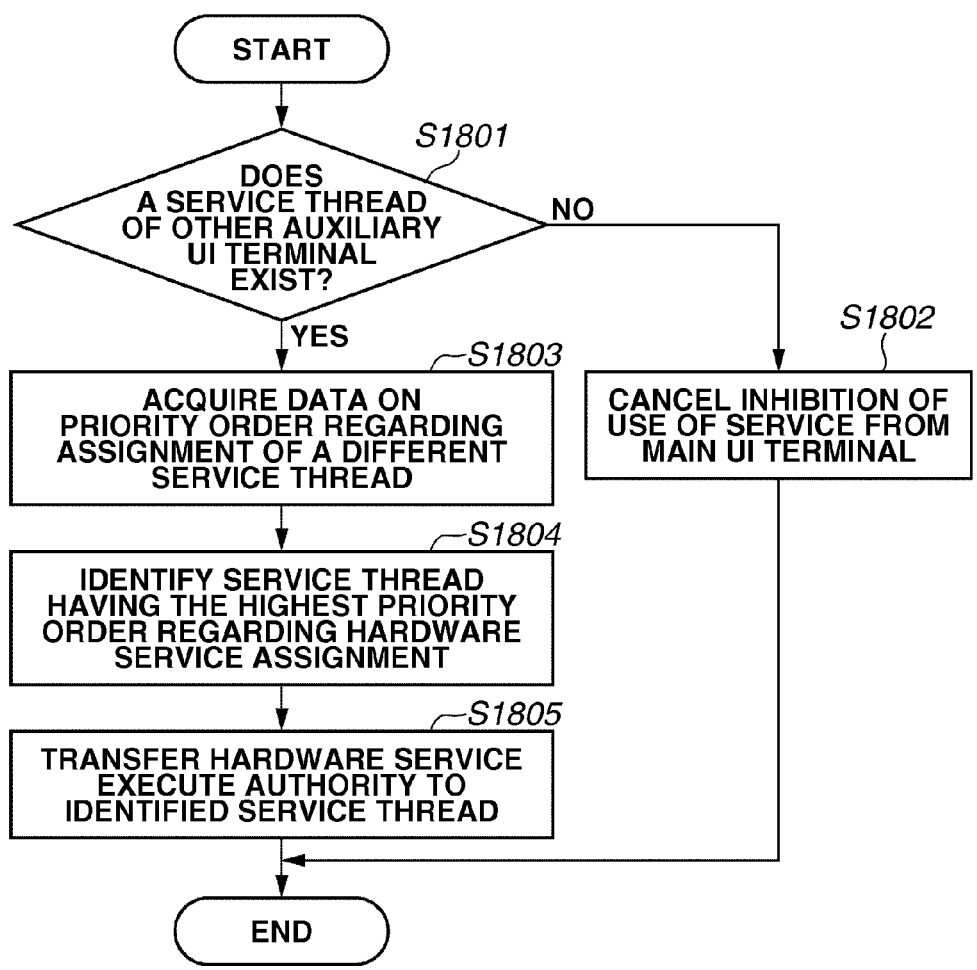
FIG. 18 is a flowchart illustrating processing of hardware service execute authority transfer from the auxiliary UI terminal according to the first exemplary embodiment of the present invention.

FIG. 18 is a flowchart illustrating processing of hardware service execute authority transfer from the auxiliary UI terminal according to the present exemplary embodiment. This operation is realized when the CPU 201 reads and executes a program stored in the RAM 202. As described in step S803 in FIG. 8, if the CPU 201 receives the service end request when the hardware service execute authority is assigned to the service thread, the CPU 201 executes the processing of hardware service execute authority transfer. In step S1801, the CPU 201 checks whether a service thread of an auxiliary UI terminal other than the service thread of the auxiliary UI terminal, which currently has the hardware service execute authority, is in the RAM 202. If the CPU 201 determines that such a service thread does not exist in the RAM 202 (NO in step S1801), the process proceeds to step S1802.

In step S1802, the CPU 201 cancels the inhibition of the use of the service by the user via the main UI terminal, which is inhibited in step S1602 in FIG. 16. Then the process ends. On the other hand, if the CPU 201 determines that such a thread exists in the RAM 202 (YES in step S1801), the process proceeds to step S1803. In step S1803, the CPU 201 acquires data on priority order regarding assignment of the hardware service of each service thread assigned to other auxiliary UI terminals. In step S1804, the CPU 201 identifies the service thread having the highest priority order out of all the service threads. Then in step S1805, the CPU 201 transfers the hardware service execute authority to the service thread having the highest priority order. Then, the process ends. At this time, the CPU 201 can set whether to permit parallel processing of a subsequent job using a hardware resource not used by a preceding job. Details of this setting will be described below referring to FIGS. 29 through 38.

Figure 19:
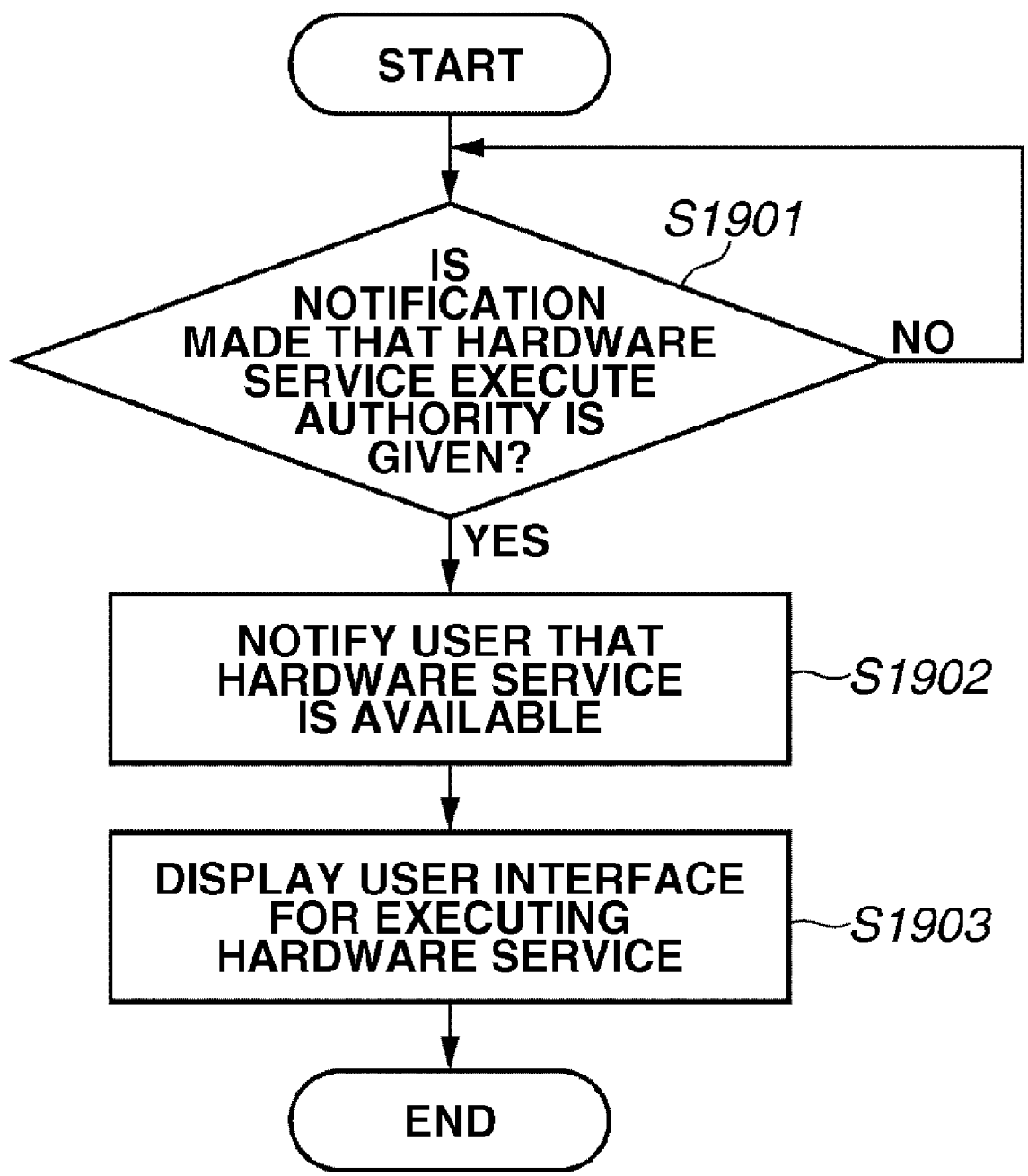
FIG. 19 is a flowchart illustrating an operation of the auxiliary UI terminal which is given the hardware service execute authority according to the first exemplary embodiment of the present invention.
Figure 20:
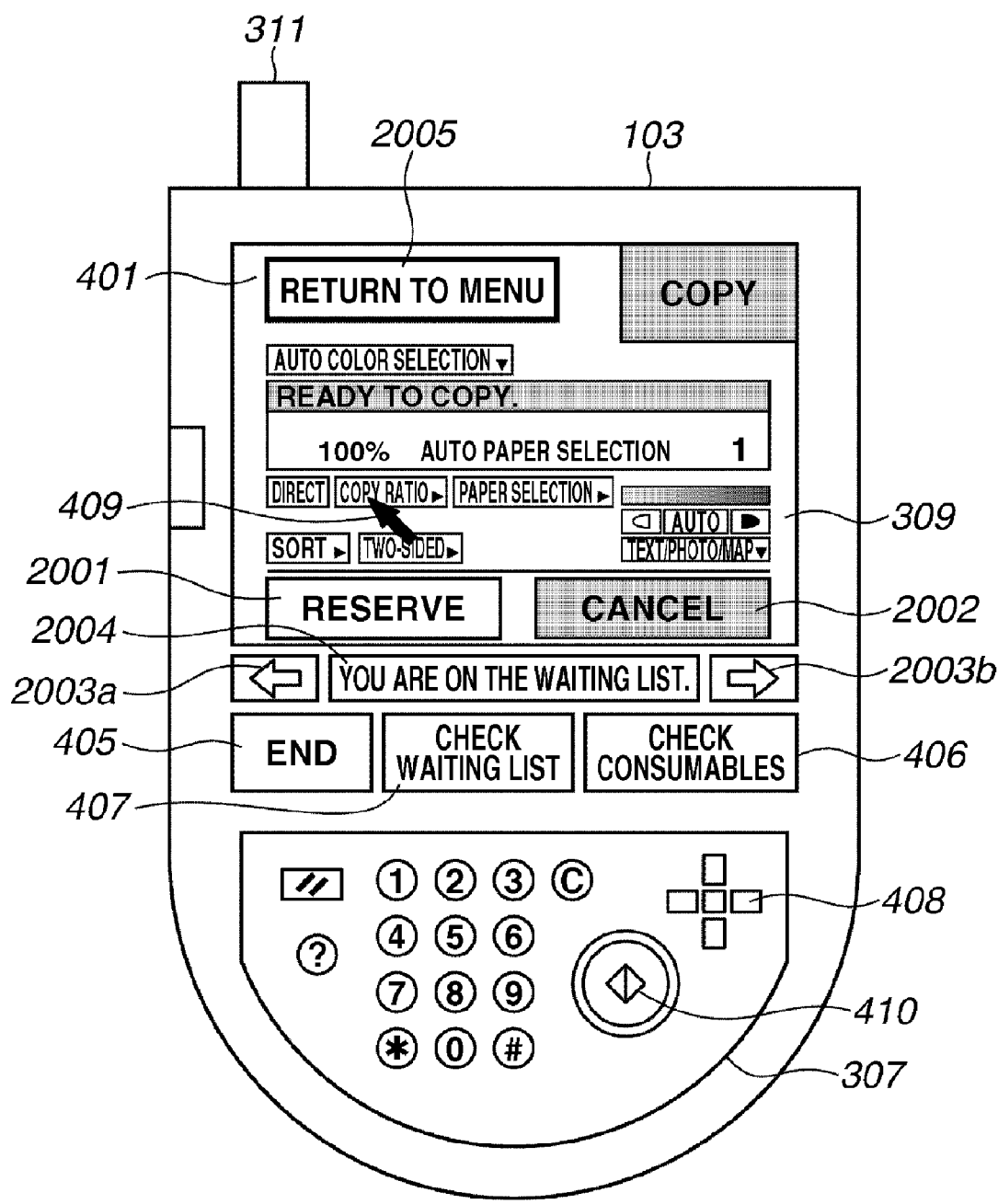
FIG. 20 illustrates the auxiliary UI terminal which is given software service execute authority but is not given the hardware service execute authority according to the first exemplary embodiment of the present invention.

If the hardware service execute authority is given by the above-described hardware service execute authority transfer processing, the CPU 301 of the auxiliary UI terminal 103 performs an operation illustrated in FIGS. 19 through 22. FIG. 19 is a flowchart illustrating an operation of the auxiliary UI terminal 103 which is given the hardware service execute authority according to the present embodiment. This operation is realized when the CPU 301 reads and executes a program stored in the memory 302. FIG. 20 illustrates the auxiliary UI terminal 103 which is given software service execute authority but is not yet given the hardware service execute authority according to the present embodiment. The auxiliary UI terminal 103 illustrated in FIG. 20 is also in a state where "copy" is selected from the operation menu item 402a of a menu selection illustrated in FIG. 4. In FIG. 20, a menu screen for using the copy service is displayed on the display unit 309.

Scroll buttons 2003a and 2003b are used for changing the display to a different menu screen relating to the currently-selected menu item. A selected menu item status bar 2004 displays a status of the currently-selected menu item. A button 2005 is used for returning to the menu selection illustrated in FIG. 4. A reserve button 2001 is used for reserving execution of copy in the current setting. Since the hardware service execute authority is not given, copy, which is one kind of hardware service, cannot be executed.

Figure 21:
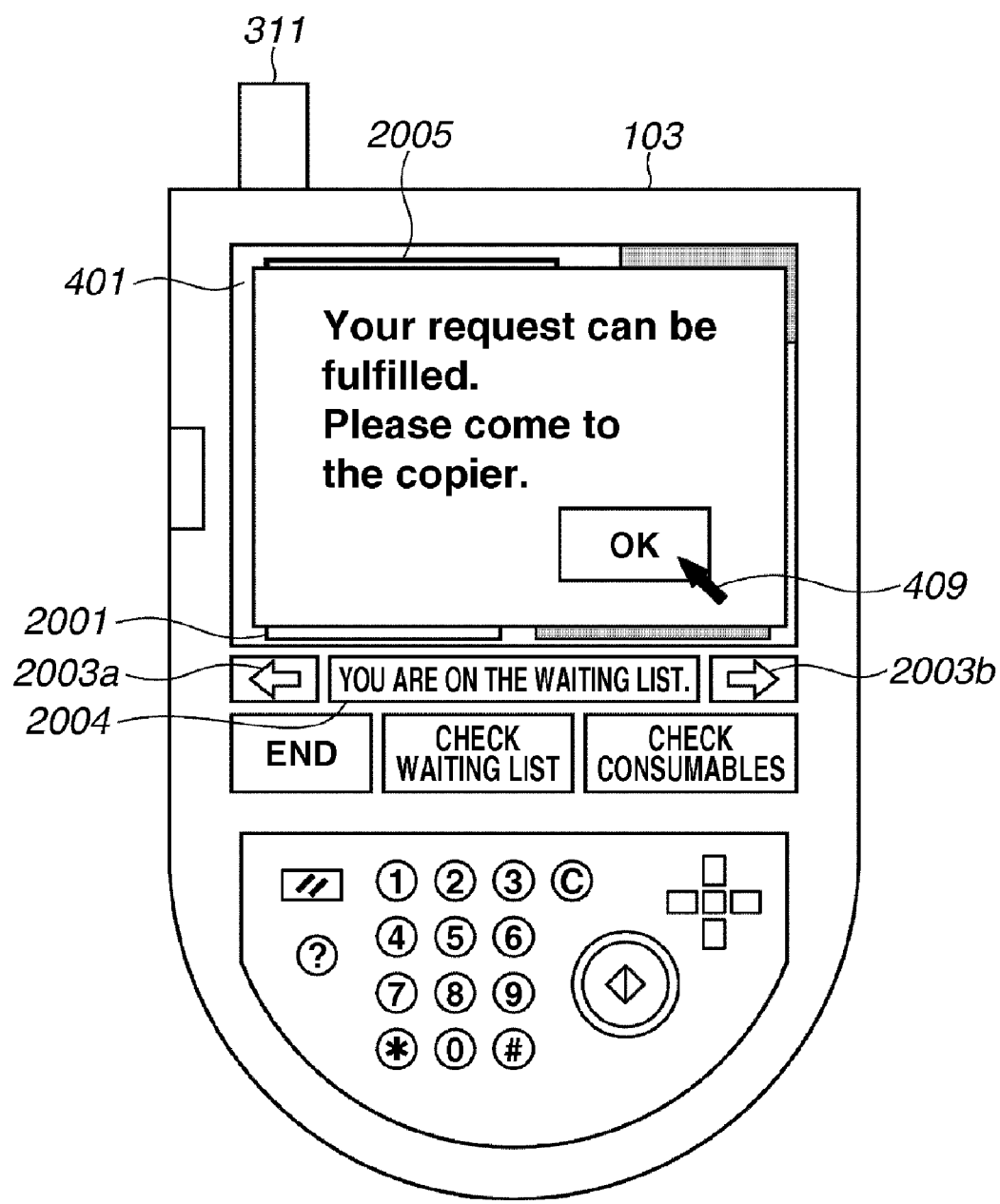
FIG. 21 illustrates the auxiliary UI terminal informing the user that a hardware service is executable according to the first exemplary embodiment of the present invention.

According to the present embodiment, the hardware service includes execution of printing by the printing unit 206 which is a print engine of the MFP 100 as well as execution of scanning by the scanner unit 208 of the MFP 100. A cancel button 2002 is used for canceling a service reserved by a reserve button 2001. In step S1901 in FIG. 19, if the hardware service execute authority is given to a service thread, the CPU 301 of the auxiliary UI terminal corresponding to the service thread is notified by the MFP 100 that the hardware service execute authority is given to the auxiliary UI terminal. If the CPU 301 determines that the notification is given (YES in step S1901), then in step S1902, the CPU 301 displays a message notifying the user that the hardware service has become available as illustrated in FIG. 21.

Figure 22:
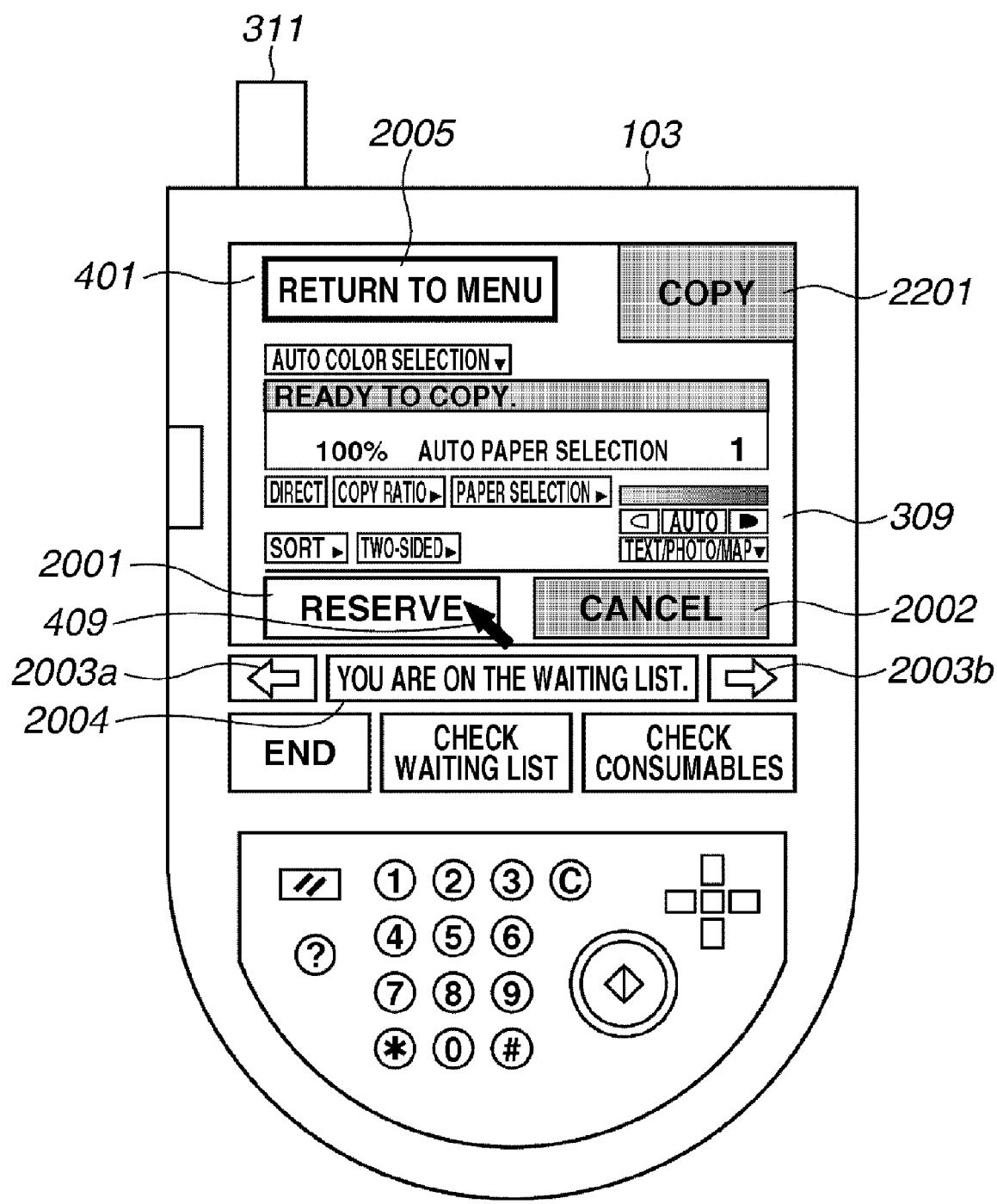
FIG. 22 illustrates the auxiliary UI terminal displaying a user interface for executing the hardware service according to the first exemplary embodiment of the present invention.

Next, in step S1903, the CPU 301 changes the display to a user interface for executing the hardware service. Then, the process ends. FIG. 22 illustrates the auxiliary UI terminal 103 displaying a user interface for executing the hardware service. In FIG. 22, a copy button 2201 is used for executing copy of an item which is reserved using the reserve button 2001 or executing copy in the current setting.

Next, an example of using software service of the MFP 100 by the auxiliary UI terminal 103 will be described.

Figure 23:
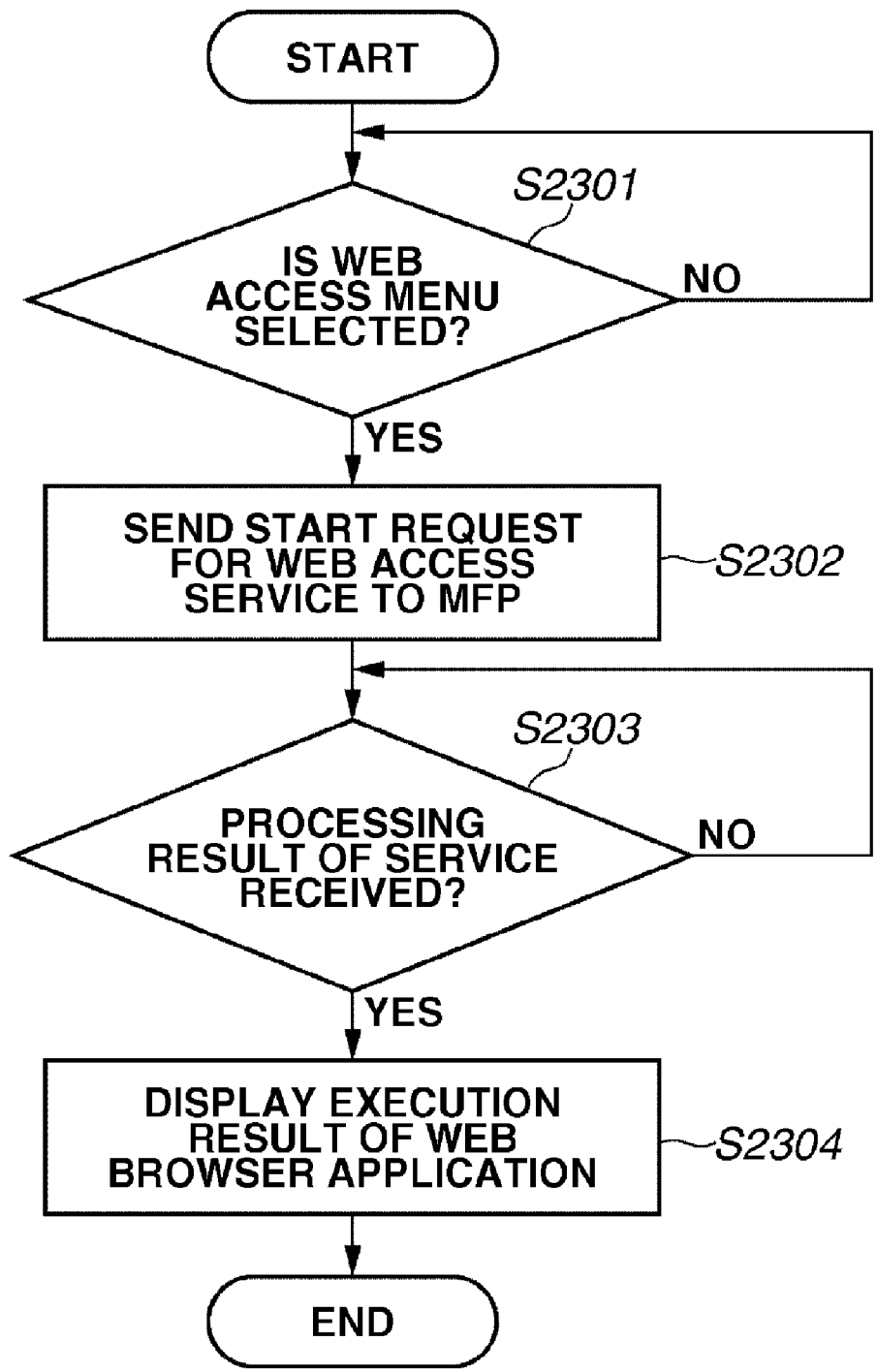
FIG. 23 is a flowchart illustrating an operation of the auxiliary UI terminal when a web browser service is being provided according to the first exemplary embodiment of the present invention.

FIG. 23 is a flowchart illustrating an operation of the auxiliary UI terminal 103 when a web browser service is requested. This operation is realized when the CPU 301 reads and executes a program stored in the memory 302. In step S2301, the user selects "WEB" from the menu selection screen of the auxiliary UI terminal 103 illustrated in FIG. 4. If the CPU 301 determines that the "WEB" is selected (YES in step S2301), then in step S2302, the CPU 301 requests the MFP 100 to start providing web access service via wireless communication. As described referring to steps S609 through S611 in FIG. 6, the CPU 201 performs processing of the requested service in units of service thread corresponding to the auxiliary UI terminal and transmits the processing result to the auxiliary UI terminal. In this case, the CPU 201 activates a web browser application stored in the RAM 202 of the MFP 100 according to the service thread.

Figure 24:
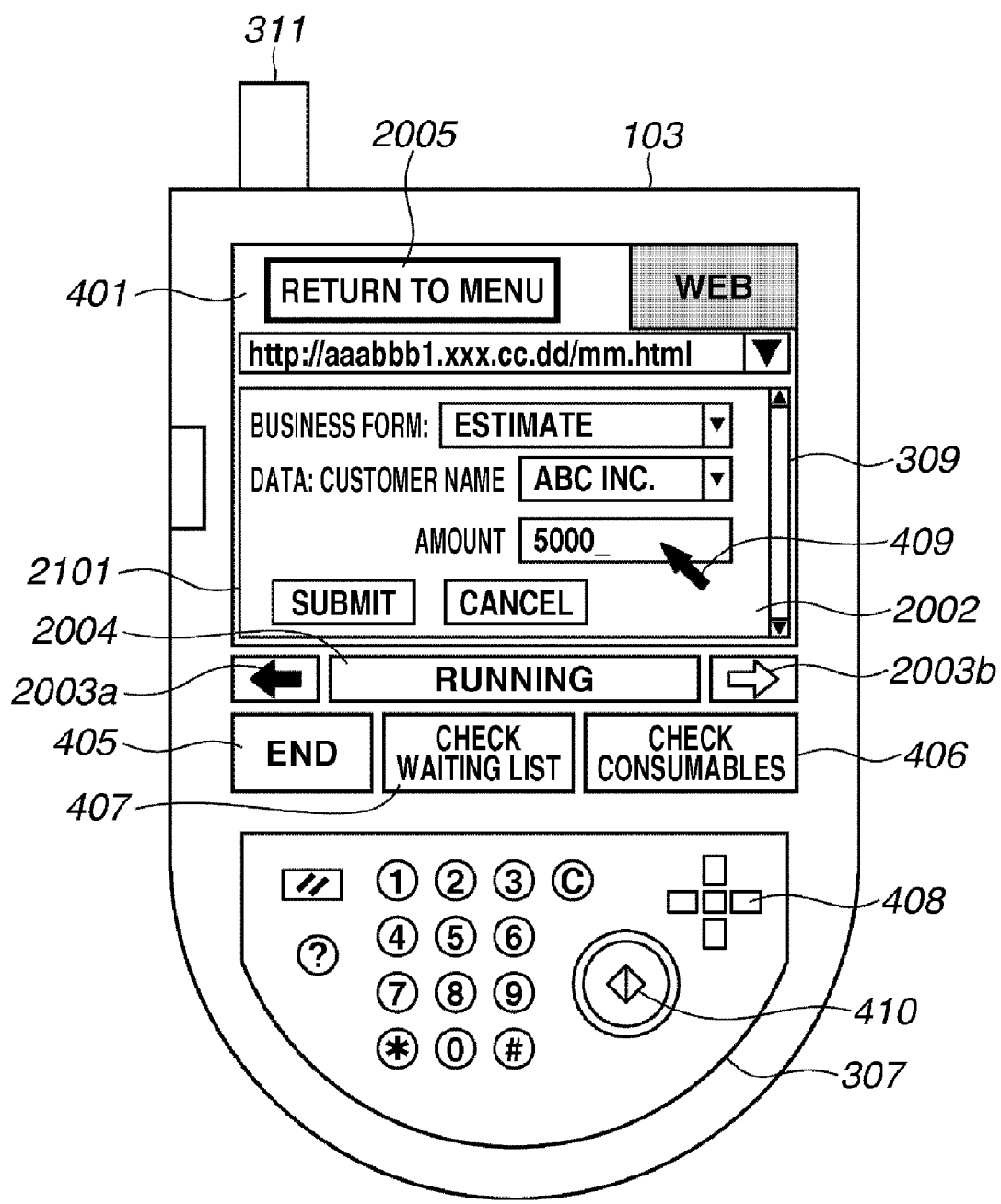
FIG. 24 illustrates the auxiliary UI terminal when a web browser function of the MFP is used according to the first exemplary embodiment of the present invention.

In step S2303, the CPU 301 receives display data acquired by using the web browser application. This display data is a processing result of the software service. If the CPU 301 determines that it has received the display data (YES in step S2303), the process proceeds to step S2304. In step S2304, the CPU 301 changes the display on the display unit 309 according to the processing result. FIG. 24 illustrates the auxiliary UI terminal 103 when a web browser function of the MFP 100 is being used. The execution result of the web browser application activated in the RAM 202 is displayed on the display unit 309 of the auxiliary UI terminal 103.

Figure 25:
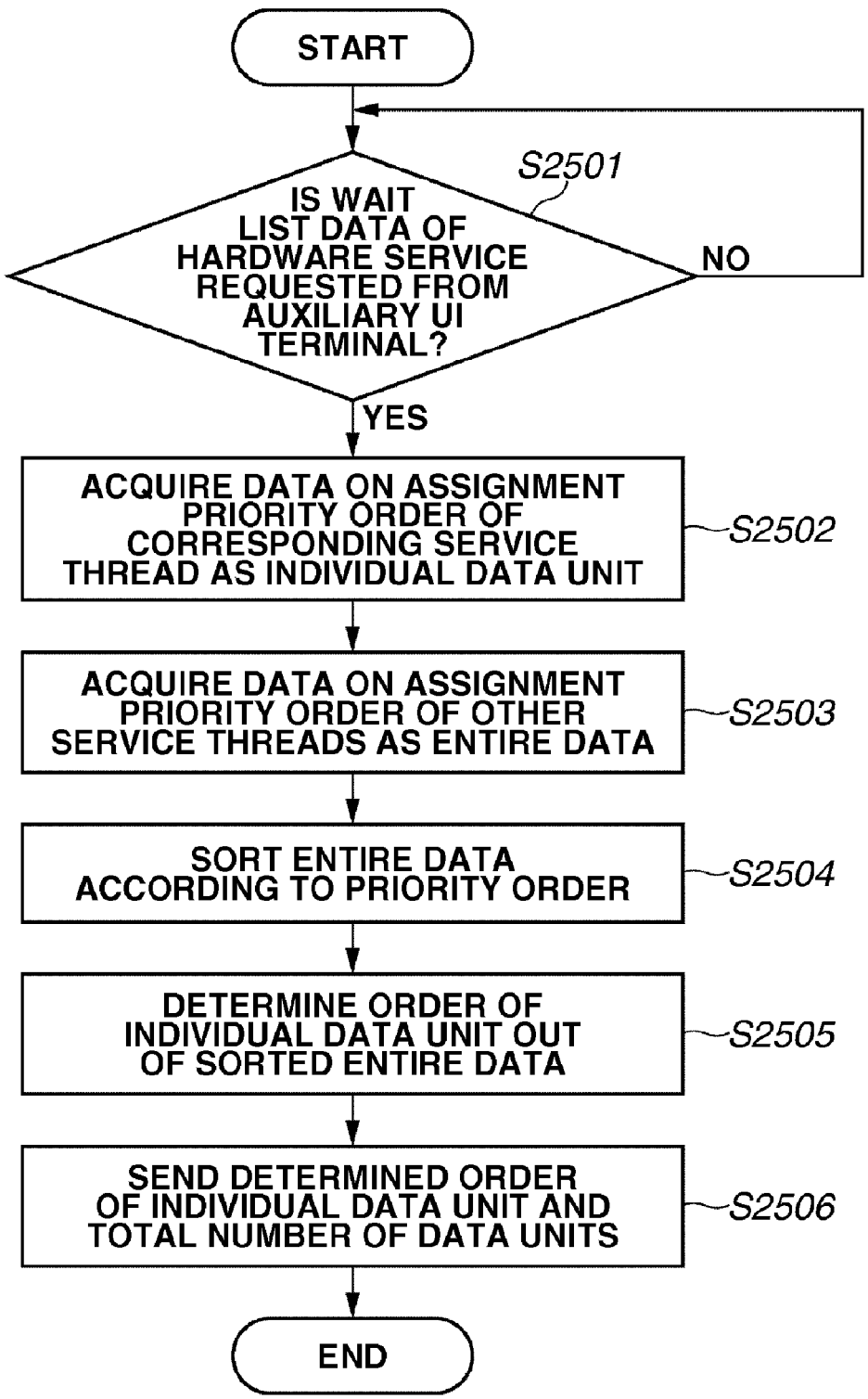
FIG. 25 is a flowchart illustrating an operation of the MFP when a request for waiting list data of the hardware service is received according to the first exemplary embodiment of the present invention.

Next, displaying of the waiting list of the hardware service on the auxiliary UI terminal 103 will be described. FIG. 25 is a flowchart illustrating an operation of the MFP 100 when waiting list data of the hardware service is requested. This operation is realized when the CPU 201 reads and executes a program stored in the RAM 202. In step S2501, the CPU 201 determines whether a request for waiting list data of the hardware service of the auxiliary UI terminal is sent to the MFP 100 via the wireless communication by the user pressing the waiting list check button 407 of the auxiliary UI terminal 103 illustrated in FIG. 4. If the CPU 201 receives such a request from the MFP 100 (YES in step S2501), then in step S2502, the CPU 201 acquires data on hardware service assignment priority order of the service thread corresponding to the auxiliary UI terminal as an individual data unit.

Figure 26:
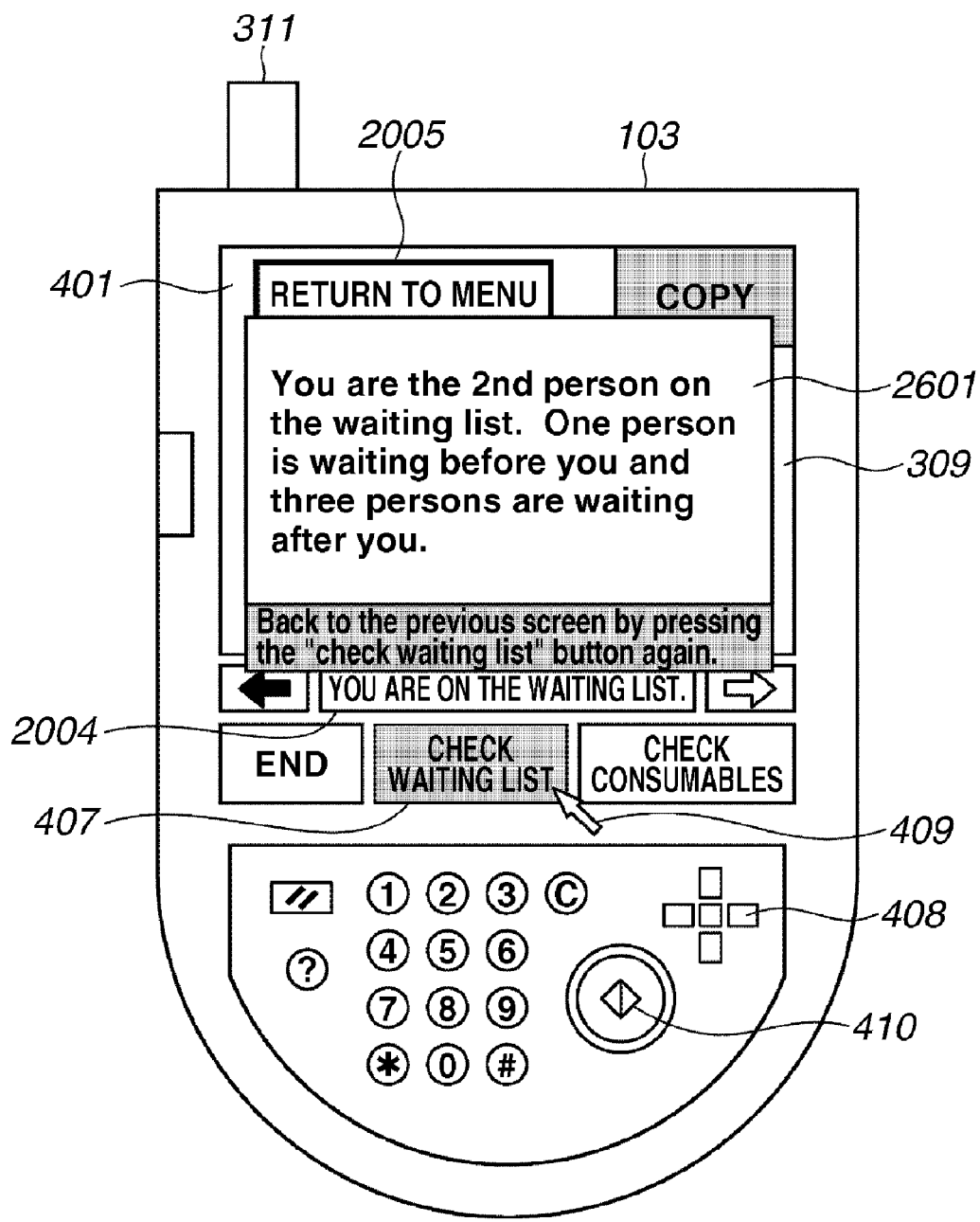
FIG. 26 illustrates the auxiliary UI terminal displaying the waiting list data sent from the MFP according to the first exemplary embodiment of the present invention.

In step S2503, the CPU 201 acquires data on a hardware service assignment priority order of service threads of auxiliary UI terminals other than the auxiliary UI terminal whose service thread is given the hardware service assignment priority order in step S2502 as entire data. In step S2504, the CPU 201 sorts the entire data in descending order based on the priority order. In step S2505, the CPU 201 determines the order of the above-described individual data unit in the sorted entire data. Next, in step S2506, the CPU 201 transmits the determined order of the individual data unit and the total number of pieces of data included in the entire data to the auxiliary UI terminal that requested the data via the wireless communication. Then, the process ends. FIG. 26 illustrates the auxiliary UI terminal 103 displaying the waiting list data sent from the MFP 100. A window 2601 showing the waiting list of the hardware service is displayed on the display unit 309.

Figure 27:
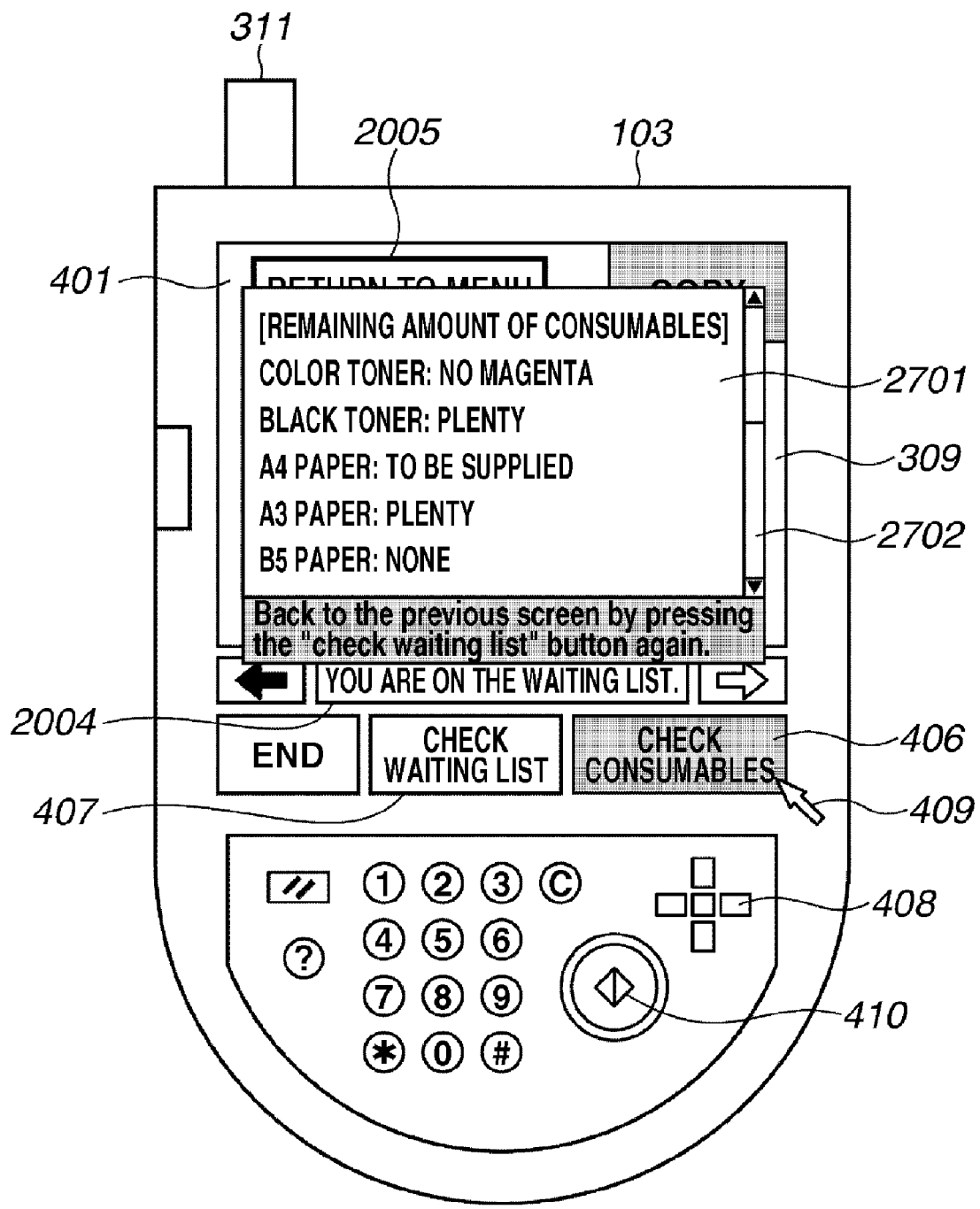
FIG. 27 illustrates the auxiliary UI terminal displaying data on a state of consumables according to the first exemplary embodiment of the present invention.

Next, monitoring of a state of consumables of the MFP 100 using the auxiliary UI terminal 103 will be described. When the user presses the consumables check button 406 of the auxiliary UI terminal 103 illustrated in FIG. 4, the CPU 201 of an auxiliary UI terminal 103 sends a request for monitoring data regarding a state of consumables of the MFP 100 to the MFP 100 via the wireless communication. The MFP 100, which has received the request, sends data on the state of consumables to the auxiliary UI terminal that requested the data via the wireless communication. FIG. 27 illustrates the auxiliary UI terminal 103 displaying data on the state of consumables. A window 2701 showing data on the state of consumables is displayed on the display unit 309.

Figure 28:
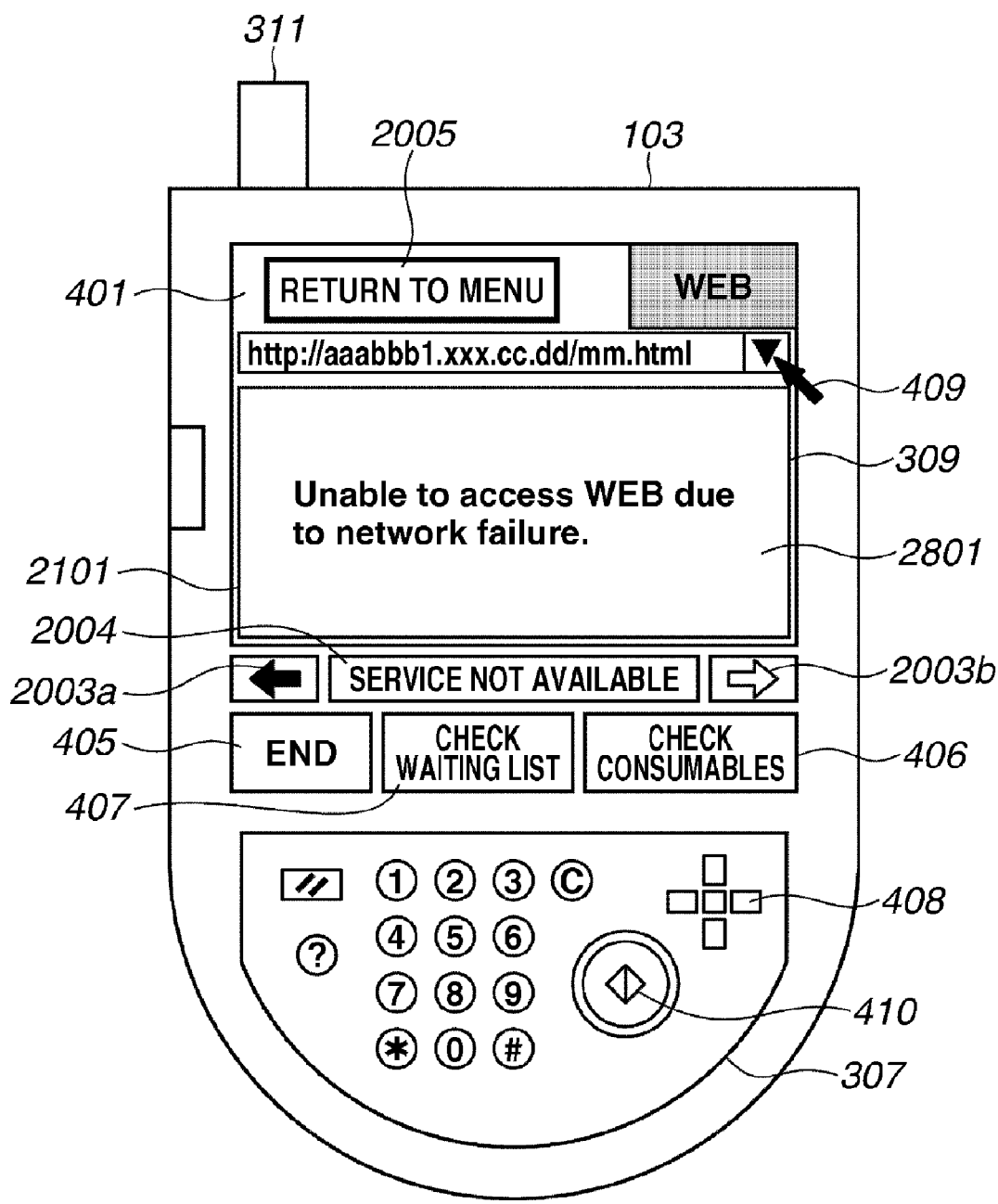
FIG. 28 illustrates the auxiliary UI terminal in a state where a web service cannot be used according to the first exemplary embodiment of the present invention.

Next, an operation of the auxiliary UI terminal 103 when the MFP 100 is unable to provide a service will be described. FIG. 28 illustrates the auxiliary UI terminal 103 in a state where a web service cannot be used. A window 2801 showing a service error acquired from a result of processing in step S2304 in FIG. 23 is displayed on the display unit 309.

As described above, according to the priority order of the hardware service execute authority, a plurality of jobs (e.g., reading processing and print processing) are executed one by one. However, a multifunction peripheral having both the reading function and the printing function is able to use the reading function in parallel with the printing function. Thus, when a plurality of different jobs having consecutive numbers in the priority order of the hardware service execute authority use different functions, parallel processing of the jobs becomes an issue. Processing of the hardware service in such a case will be described below. It is to be noted that, according to the present embodiment, the first job is a job which is given the highest priority order of the hardware service execute authority, and the second job is a job which is given the second highest priority order of the hardware service execute authority.

Type of jobs are, for example, a printing job of the print processing using the printing unit 206, a reading job of the reading processing using the scanner unit 208, and a copy job of the print processing using the printing unit 206 which is performed after the reading processing using the scanner unit 208. The copy job can be regarded as a combination of the reading job and the printing job. Further, the print processing is processing including printing of data sent from a personal computer (PC), printing of received FAX, and printing of data stored in the BOX. Further, the reading processing is processing including scanning for retrieving data to be sent to the PC, scanning of FAX to be sent, scanning for retrieving data to be stored in the BOX. If a different hardware resource is used for the first job and the second job, then the first and the second jobs can be processed in parallel.

A state where the first job is input is a state where the hardware service execute authority is given to the first job and the first job can execute the hardware service. A state where the second job is input is a state where the hardware service execute authority is given to the first job and the second job can execute the hardware service in parallel with the first job.

Figure 30:
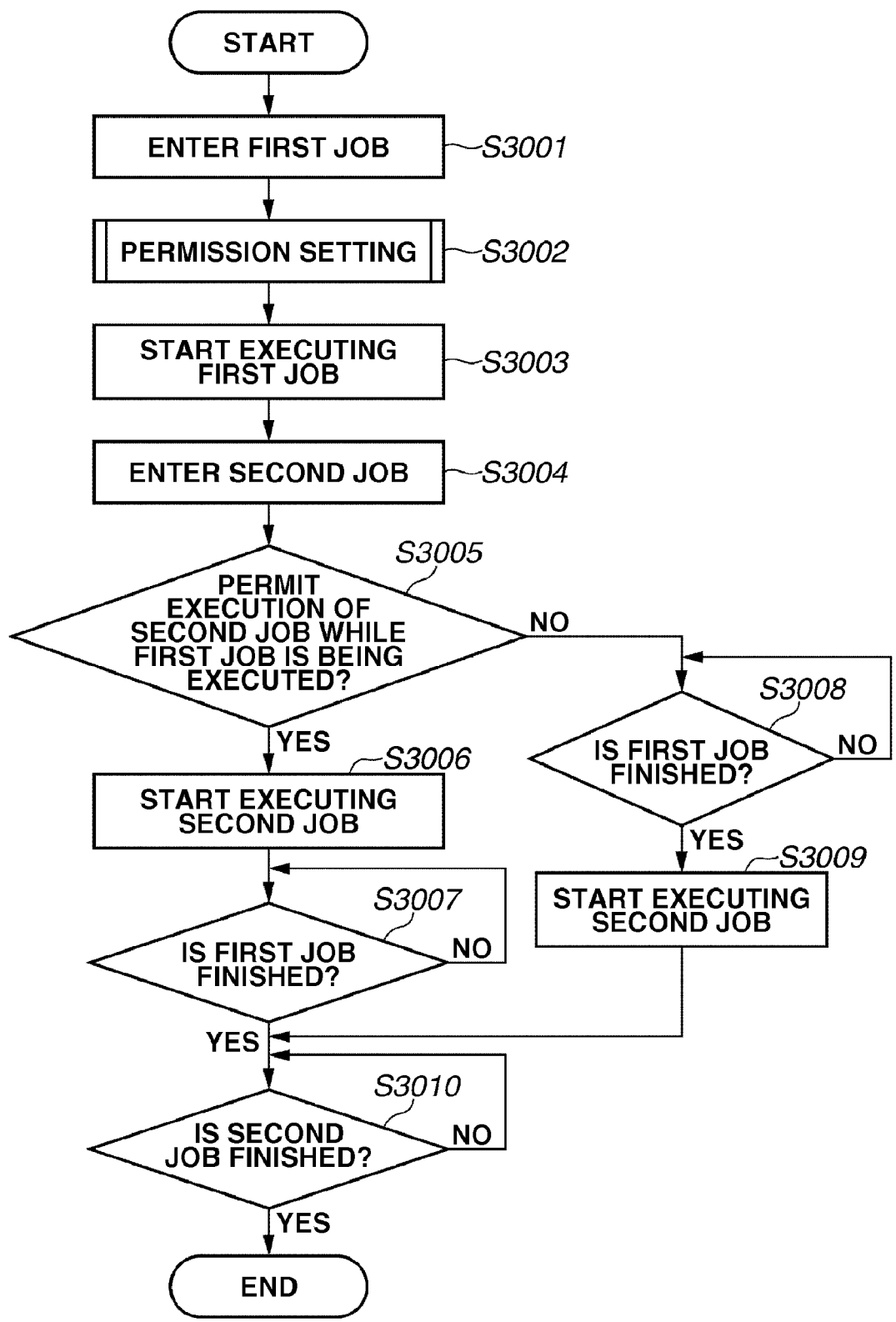
FIG. 30 is a flowchart illustrating a job processing operation (main routine) of the multifunction peripheral according to the first exemplary embodiment of the present invention.

FIG. 30 is a flowchart illustrating a main routine of a job processing operation of the multifunction peripheral 100 according to the present exemplary embodiment. This operation is realized when the CPU 201 reads and executes a program stored in the RAM 202. In step S3001, the CPU 201 inputs the first job. In step S3002, the CPU 201 defines a permission setting for the first job input in step S3001. The permission setting is a setting used for permitting execution of the second job while the first job is in execution. The "in-execution" state of the first job indicates the state from the start to the end of reading processing or print processing as the first job. Details of step S3002 will be described below referring to FIG. 31.

In step S3003, the CPU 201 starts executing the first job input in step S3001 by the printing unit 206 or the scanner unit 208. In step S3004, the CPU 201 inputs the second job. In step S3005, the CPU 201 determines whether a setting that permits execution of the second job while the first job is in execution is made in the permission setting in step S3002. If the CPU 201 determines that the execution of the second job is permitted while the first job is in execution (YES in step S3005), the process proceeds to step S3006. On the other hand, if the CPU 201 determines that the execution of the second job is not permitted while the first job is in execution (NO in step S3005), the process proceeds to step S3008. In step S3006, the CPU 201 starts processing the second job, which is input in step S3004, by the printing unit 206 or the scanner unit 208. In step S3007, the CPU 201 determines whether the execution of the first job, which is started in step S3003, has been finished. If the CPU 201 determines that execution of the first job has been finished (YES in step S3007), the process proceeds to step S3010. If the execution of the first job is still in execution (NO in step S3007), the CPU 201 waits until the first job is finished.

In step S3008, the CPU 201 determines whether the execution of the first job, which is started in step S3003, has been finished. If the CPU 201 determines that the execution of the first job has been finished (YES in step S3008), the process proceeds to step S3009. If the CPU 201 determines that execution of the first job has not been finished (NO in step S3008), the CPU 201 waits until the first job is finished. In step S3009, the CPU 201 starts executing the second job, which is input in step S3004, by the printing unit 206 or the scanner unit 208. In step S3010, the CPU 201 determines whether the execution of the second job, which is started in step S3006 or S3009, has been finished. If the CPU 201 determines that the execution of the second job has been finished (YES in step S3010), the process ends. If the CPU 201 determines that the execution of the second job has not been finished (NO in step S3010), the CPU 201 waits until the second job is finished. The process ends when the CPU 201 determines that the execution of the second job has been finished.

Figure 31:
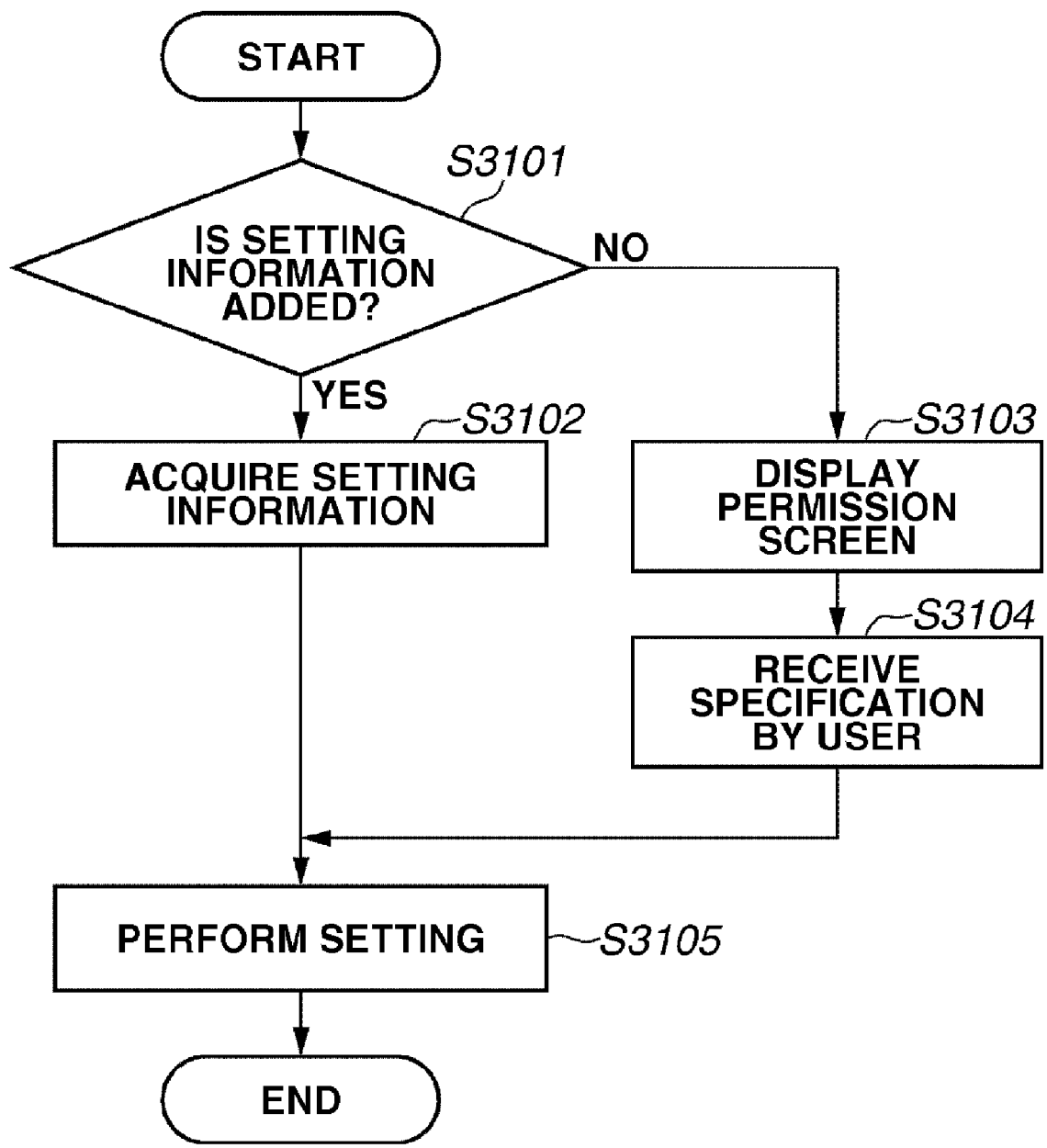
FIG. 31 is a flowchart illustrating a job processing operation (subroutine) according to the first exemplary embodiment of the present invention.

FIG. 31 is a flowchart illustrating a subroutine of the permission setting in step S3002 in FIG. 30. This operation is realized when the CPU 201 reads and executes a program stored in the RAM 202. According to the present exemplary embodiment, setting information is information used in setting whether to permit execution of the second job while the first job is in execution. If the first job is the printing job, then the setting information can be set, for example, when print data is generated or transmitted. If the first job is the reading job, then the setting information can be set, for example, when execution of reading is reserved. The setting information is input via the main UI terminal 101 or the auxiliary UI terminal 103. However, it can also be input via a host computer (not shown). In step S3101, the CPU 201 determines whether the setting information is added to the first job. If the CPU 201 determines that the setting information is added to the first job (YES in step S3101), the process proceeds to step S3102. If the CPU 201 determines that the setting information is not added to the first job (NO in step S3101), the process proceeds to step S3103.

Figure 32:
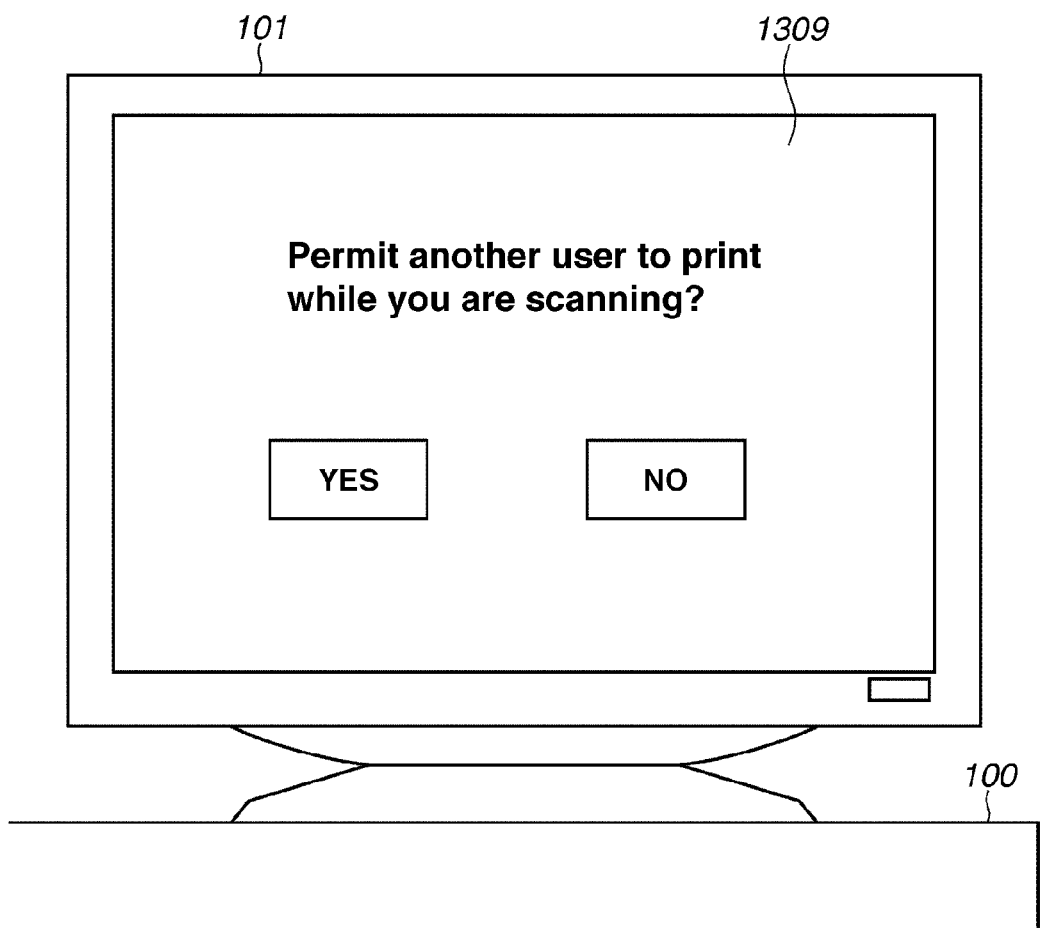
FIG. 32 illustrates a selection screen of the main UI terminal which is used for determining whether to permit execution for a first job according to the first exemplary embodiment of the present invention.
Figure 38:
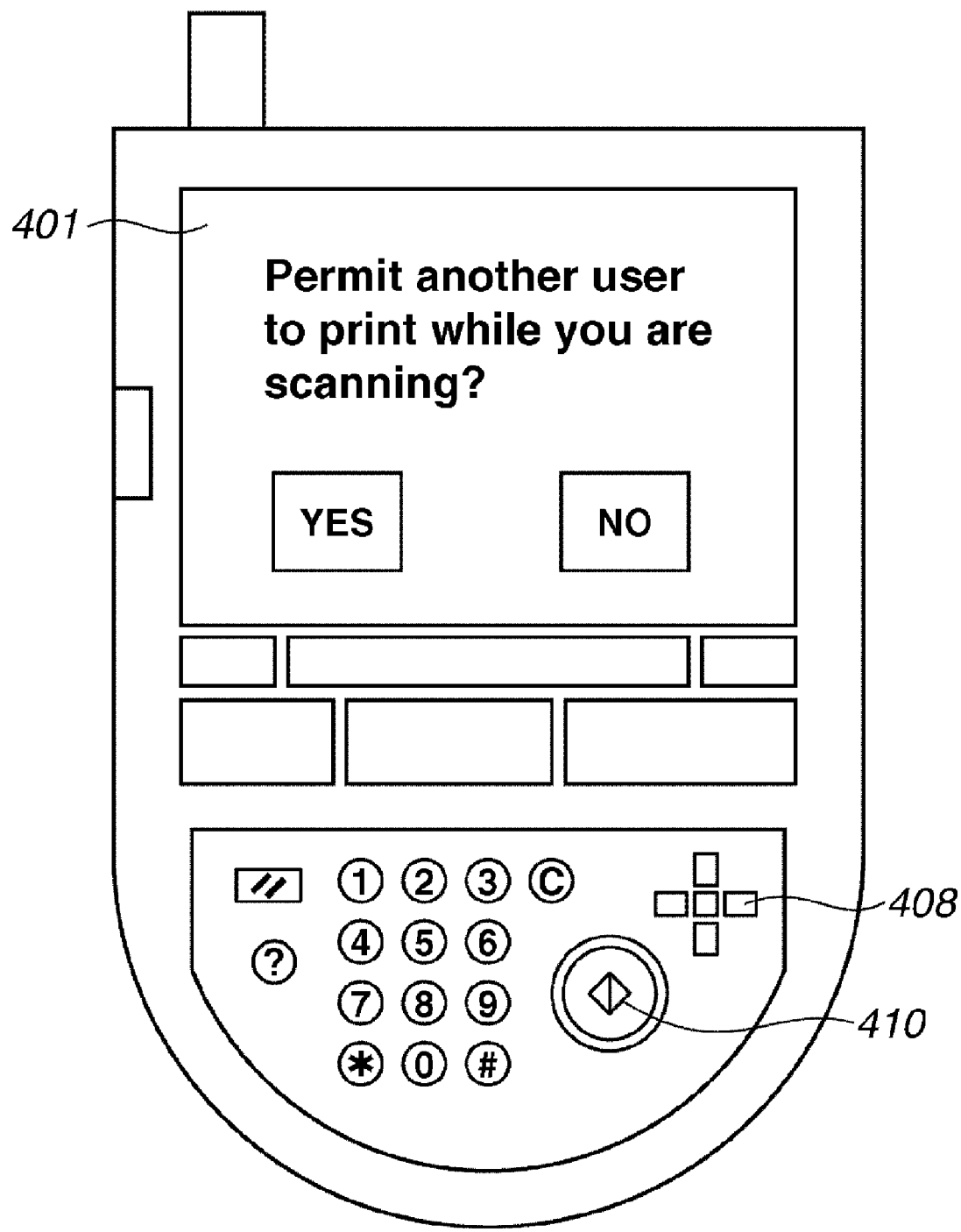
FIG. 38 illustrates a selection screen of the auxiliary UI terminal which is used for determining whether to permit execution for the first job according to the first exemplary embodiment of the present invention.

In step S3102, the CPU 201 acquires setting information on the first job. In step S3103, the CPU 201 displays a screen operable by the user to determine whether to permit execution of the second job while the first job is in execution on the display of the main UI terminal 101 or on the display of the auxiliary UI terminal 103. FIG. 32 is an example of a screen displayed on the display of the main UI terminal 101 in step S3103. FIG. 38 is an example of a screen displayed on the display of the auxiliary UI terminal 103 in step S3103. In step S3104, the CPU 201 receives the determination from the user whether to permit execution of the second job while the first job is in execution. For example, the user uses the screen displayed in FIG. 32 or FIG. 38 in making the determination. In step S3105, the CPU 201 performs setting as to whether to permit execution of the second job while the first job is in execution based on the setting information acquired in step S3102 or the specification received in step S3104.

Figure 39:
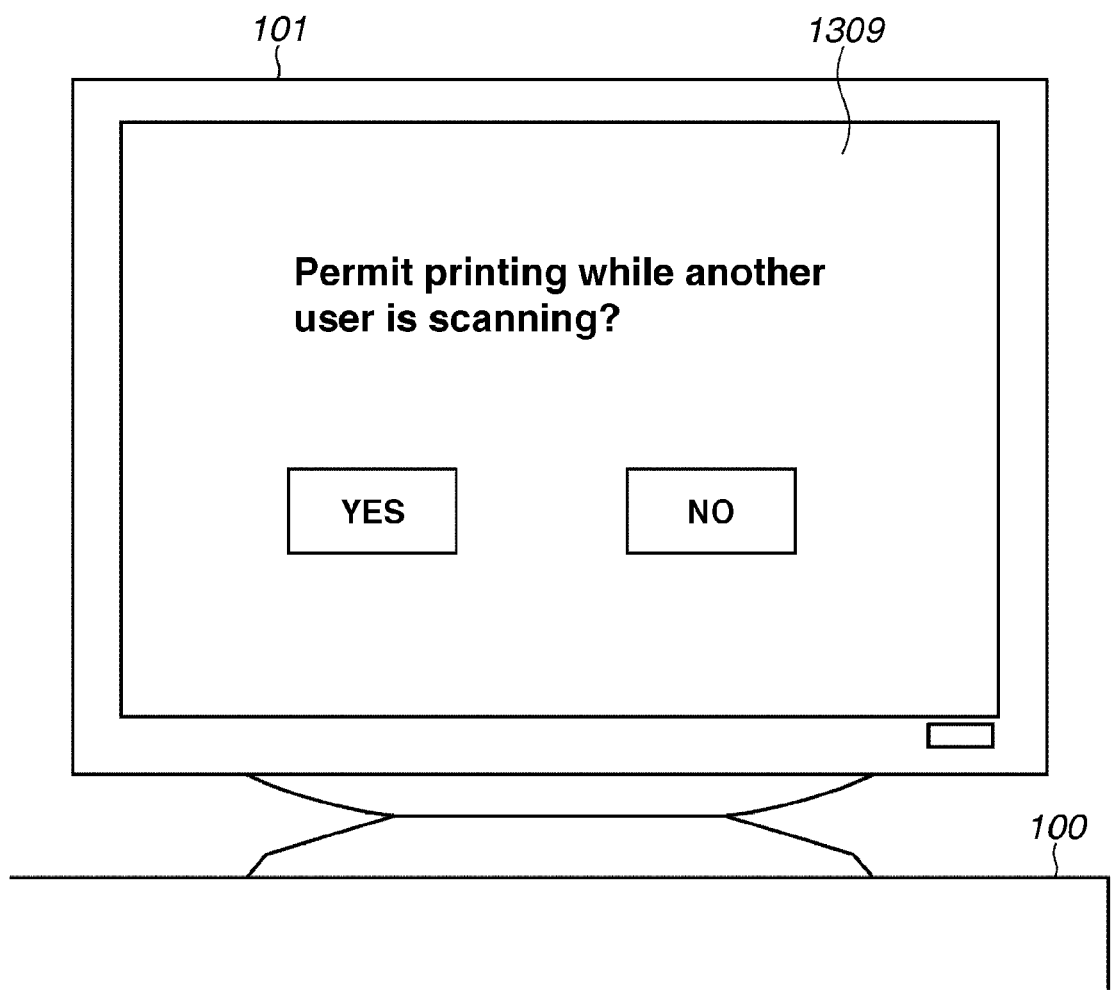
FIG. 39 illustrates a selection screen of the main UI terminal which is used for determining whether to permit execution for a second job according to the first exemplary embodiment of the present invention.
Figure 40:
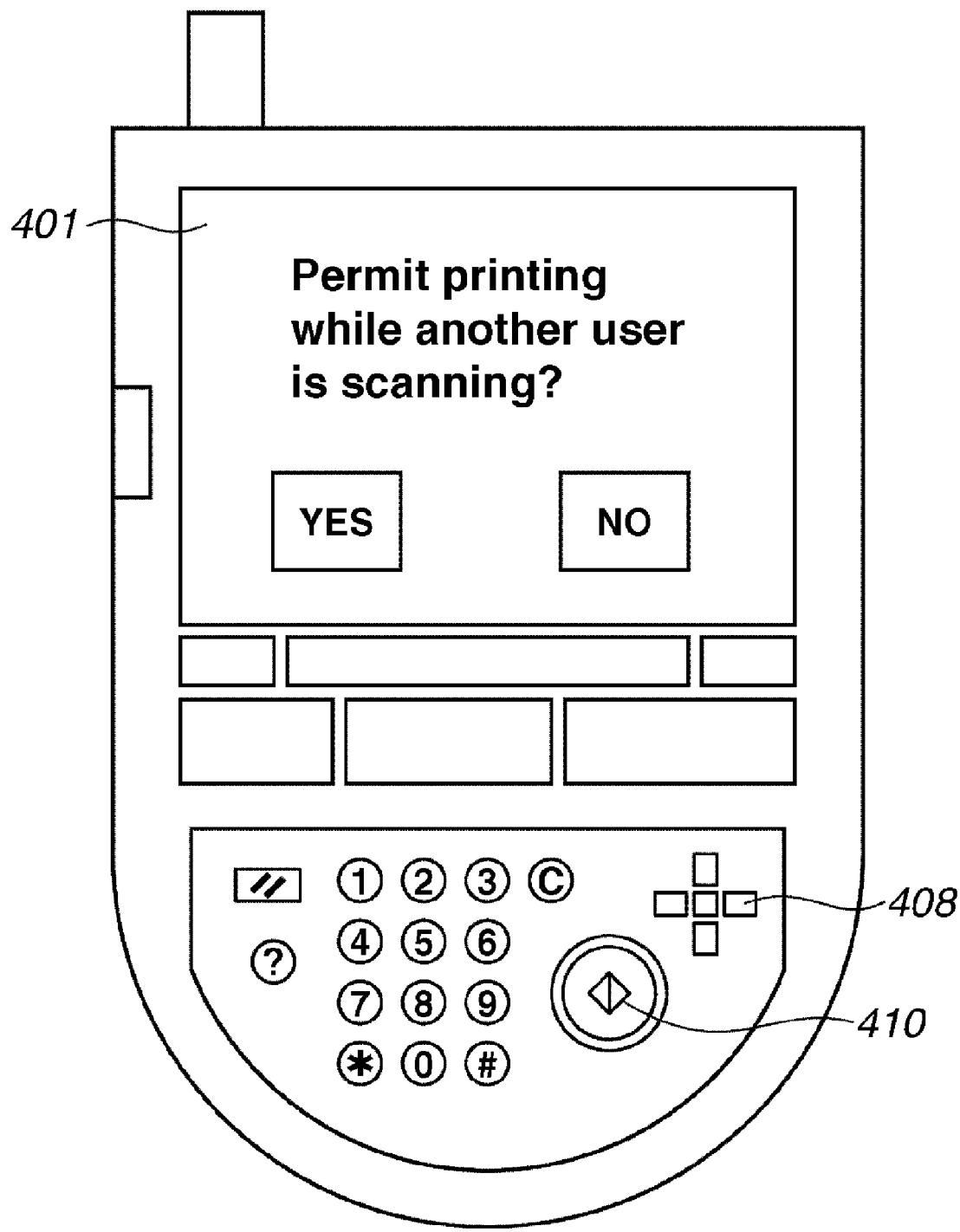
FIG. 40 illustrates a selection screen of the auxiliary UI terminal which is used for determining whether to permit execution for the second job according to the first exemplary embodiment of the present invention.

According to the above description, control as to whether to permit execution of the second job while the first job is in execution is made based on a setting for the first job. However, this control can also be made on a setting for the second job. In this case, the setting in step S3002 will be made for the second job after step S3004. In that case, the screen displayed on the display of the main UI terminal 101 or the auxiliary UI terminal 103, which is used in making the setting, is such as the one illustrated in FIG. 39 or FIG. 40, respectively.

Further, determination in step S3005 will be made based on a setting of the second job. In such a case, a setting can be made for both the first and the second jobs regarding whether to permit execution of the second job while the first job is in execution. In this case, permission to execute the second job while the first job is in execution is given only when a setting for permitting execution of the second job while the first job is in execution is made for both the first and the second jobs. If a setting not to permit execution of the second job while the first job is in execution is made to either or both of the first and the second jobs, execution of the second job while the first job is in execution will not be permitted.

According to the present embodiment, whether to permit execution of a subsequent job while a preceding job is in execution can be set on a multifunction peripheral having both a reading function and a printing function for each job before the subsequent job is input.

Second Exemplary Embodiment

A second exemplary embodiment of the present invention will now be described.

A difference between the second exemplary embodiment and the first exemplary embodiment is timing of permission setting. According to the first exemplary embodiment, the permission setting is performed before a subsequent job is input. However, according to the second exemplary embodiment, the permission setting is made after a subsequent job is input.

Figure 33:
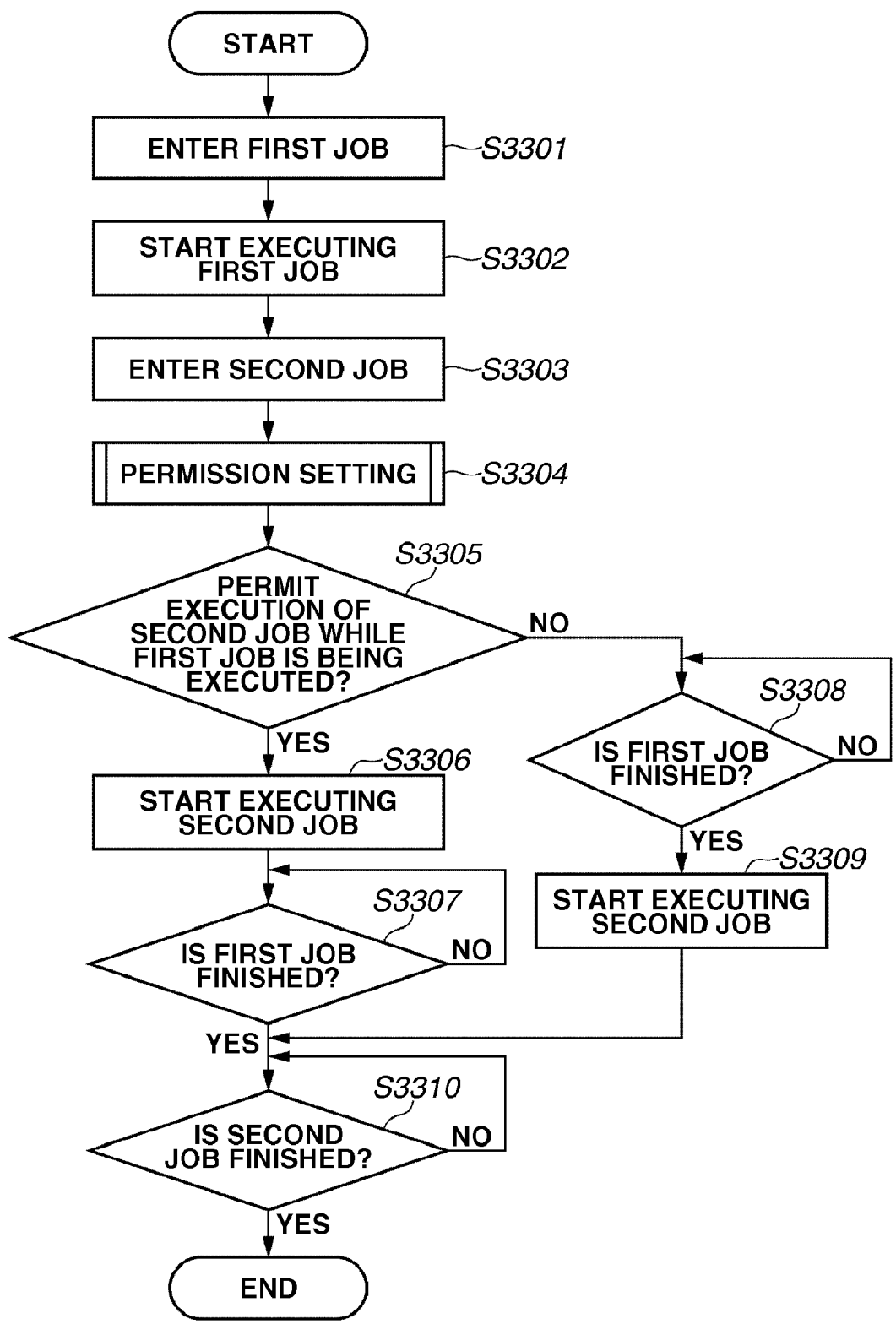
FIG. 33 is a flowchart illustrating a job processing operation (main routine) of the multifunction peripheral according to a second exemplary embodiment of the present invention.

FIG. 33 is a flowchart illustrating a main routine of a job processing operation of the multifunction peripheral 100 according to the present exemplary embodiment. This operation is realized when the CPU 201 reads and executes a program stored in the RAM 202. In step S3301, the CPU 201 inputs the first job. In step S3302, the CPU 201 executes the first job input in step S3301 by the printing unit 206 or the scanner unit 208. In step S3303, the CPU 201 inputs the second job.

In step S3304, the CPU 201 makes a permission setting for the first job input in step S3301. Details of the permission setting in step S3304 is similar to the permission setting that is described referring to FIG. 31 in the first exemplary embodiment. In step S3305, the CPU 201 determines whether a setting that permits execution of the second job while the first job is in execution is made in the permission setting in step S3304. If the CPU 201 determines that the execution of the second job is permitted while the first job is in execution (YES in step S3305), the process proceeds to step S3306. On the other hand, if the CPU 201 determines that the execution of the second job is not permitted while the first job is in execution (NO in step S3305), the process proceeds to step S3308.

In step S3306, the CPU 201 starts executing the second job input in step S3303 by the printing unit 206 or the scanner unit 208. In step S3307, the CPU 201 determines whether the execution of the first job, which is started in step S3302, has been finished. If the CPU 201 determines that execution of the first job has been finished (YES in step S3307), the process proceeds to step S3310. If the first job is still in execution (NO in step S3307), the CPU 201 waits until the first job is finished. In step S3308, the CPU 201 determines whether the execution of the first job, which is started in step S3302, has been finished. If the CPU 201 determines that the execution of the first job has been finished (YES in step S3308), the process proceeds to step S3309. If the CPU 201 determines that the execution of the first job has not been finished (NO in step S3308), the CPU 201 waits until the first job is finished. In step S3309, the CPU 201 starts executing the second job, which is input in step S3303, by the printing unit 206 or the scanner unit 208.

In step S3310, the CPU 201 determines whether the execution of the second job, which is started in step S3306 or S3309, has been finished. If the CPU 201 determines that the execution of the second job has been finished (YES in step S3310), the process ends. If the execution of the second job is still in execution (NO in step S3310), the CPU 201 waits until the second job is finished. The process ends when the CPU 201 determines that the execution of the second job has been finished.

According to the above description, control as to whether to permit execution of the second job while the first job is in execution is made based on a setting for the first job. However, this control can also be made on a setting for the second job. In this case, the setting in step S3304 will be made for the second job. At this time, the screen displayed on the display of the main UI terminal 101 or the auxiliary UI terminal 103, which is used in making the setting, is such as the one illustrated in FIG. 39 and FIG. 40, respectively.

Further, determination in step S3305 will be made based on a setting of the second job. In such a case, a setting can be made for both the first and the second jobs regarding whether to permit execution of the second job while the first job is in execution. In this case, permission to execute the second job while the first job is in execution is given only when a setting for permitting execution of the second job while the first job is in execution is made for both the first and the second jobs. If a setting not to permit execution of the second job while the first job is in execution is made to either or both of the first and the second jobs, execution of the second job while the first job is in execution will not be permitted.

According to the present embodiment, whether to permit execution of a subsequent job while a preceding job is in execution can be set on a multifunction peripheral having both a reading function and a printing function for each job after the subsequent job is input.

Third Exemplary Embodiment

A third exemplary embodiment of the present invention will now be described.

A difference between the third exemplary embodiment and the first exemplary embodiment is a method of permission setting. According to the first exemplary embodiment, the permission setting is made together with the preceding job. However, according to the third exemplary embodiment, the permission setting is input together with an execution condition that is input prior to the preceding job. According to the present exemplary embodiment, the execution condition includes various conditions required for executing the job. If a job concerning reading processing is performed, the execution condition includes information on setting of color, resolution, paper size, or document type.

If a job concerning print processing is performed, then the execution condition includes information on setting of color, resolution, paper size, document type, or finishing type. Generally, the execution condition is input together with the job. However, by separately inputting the execution condition prior to the execution of the job, reservation or setting of the execution of the job before inputting the job can be made in advance. The execution condition can be input via an external apparatus such as a PC.

Figure 34:
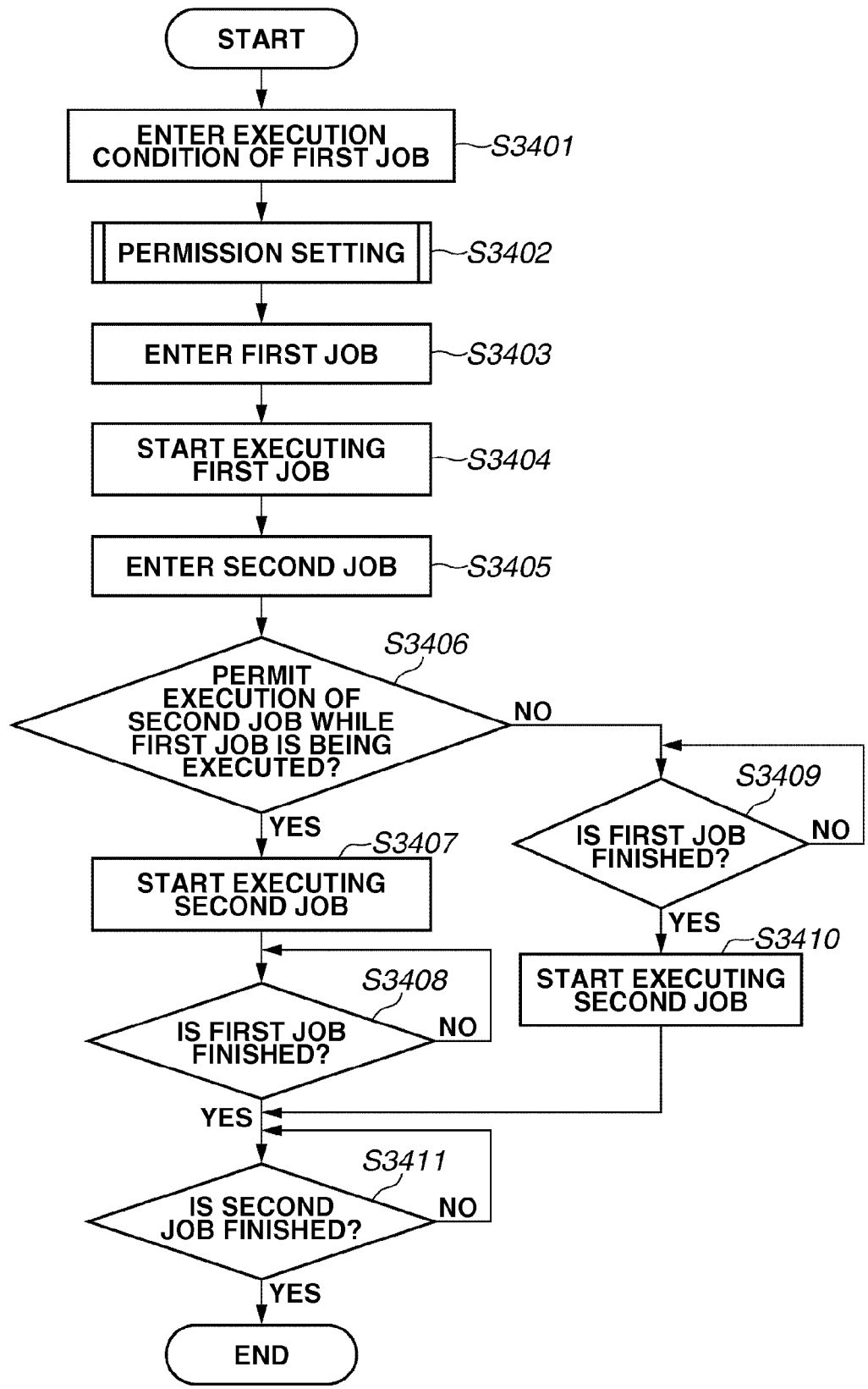
FIG. 34 is a flowchart illustrating a job processing operation (main routine) of the multifunction peripheral according to a third exemplary embodiment of the present invention.

FIG. 34 is a flowchart illustrating an example of a main routine of a job processing operation of the multifunction peripheral 100 according to the present exemplary embodiment. This operation is realized when the CPU 201 reads and executes a program stored in the RAM 202. In step S3401, the CPU 201 inputs an execution condition of the first job. In step S3402, the CPU 201 makes a permission setting for the first job. Details of the permission setting in step S3402 is similar to the permission setting that is described referring to FIG. 31 in the first exemplary embodiment.

According to the present exemplary embodiment, the CPU 201 performs the permission setting based on the setting information added to the execution condition acquired in step S3401. In step S3403, the CPU 201 inputs the first job. In step S3404, the CPU 201 executes the first job input in step S3403 by the printing unit 206 or the scanner unit 208. In step S3405, the CPU 201 inputs the second job. In step S3406, the CPU 201 determines whether a setting that permits execution of the second job while the first job is in execution is made in the permission setting in step S3402. If the CPU 201 determines that the execution of the second job is permitted while the first job is in execution (YES in step S3406), the process proceeds to step S3407. On the other hand, if the CPU 201 determines that the execution of the second job is not permitted while the first job is in execution (NO in step S3406), the process proceeds to step S3409.

In step S3407, the CPU 201 starts executing the second job input in step S3405 by the printing unit 206 or the scanner unit 208. In step S3408, the CPU 201 determines whether the execution of the first job, which is started in step S3403, has been finished. If the CPU 201 determines that execution of the first job has been finished (YES in step S3408), the process proceeds to step S3411. If the execution of the first job is still in execution (NO in step S3408), the CPU 201 waits until the first job is finished. In step S3409, the CPU 201 determines whether the execution of the first job, which is started in step S3404, has been finished. If the CPU 201 determines that the execution of the first job has been finished (YES in step S3409), the process proceeds to step S3410. If the CPU 201 determines that the execution of the first job has not been finished (NO in step S3409), then the CPU 201 waits until the first job is finished. In step S3410, the CPU 201 starts executing the second job, which is input in step S3405, by the printing unit 206 or the scanner unit 208.

In step S3411, the CPU 201 determines whether the execution of the second job, which is started in step S3407 or S3410, has been finished. If the CPU 201 determines that the execution of the second job has been finished (YES in step S3411), the process ends. If the execution of the second job is still in execution (NO in step S3411), the CPU 201 waits until the second job is finished. The process ends when the CPU 201 determines that the execution of the second job has been finished.

According to the above description, control as to whether to permit execution of the second job while the first job is in execution is made based on a setting for the first job. However, this control can also be made on a setting for the second job. In this case, the execution condition of the second job is input in step S3401 and the setting in step S3402 will be made for the second job. At this time, the screen displayed on the display of the main UI terminal 101 or the auxiliary UI terminal 103, which is used in making the setting, is such as the one illustrated in FIG. 39 and FIG. 40, respectively.

Further, determination in step S3406 will be made based on a setting of the second job. In such a case, a setting can be made for both the first and the second jobs regarding whether to permit execution of the second job while the first job is in execution. In this case, permission to execute the second job while the first job is in execution is given only when a setting for permitting execution of the second job while the first job is in execution is made for both the first and the second jobs. If a setting not to permit execution of the second job while the first job is in execution is made to either or both of the first and the second jobs, execution of the second job while the first job is in execution will not be permitted.

According to the present embodiment, whether to permit execution of a subsequent job while a preceding job is in execution can be set together with the execution condition, which is input prior to the preceding job, for each job on a multifunction peripheral having both a reading function and a printing function.

Fourth Exemplary Embodiment

A fourth exemplary embodiment of the present invention will now be described.

A difference between the fourth exemplary embodiment and the first exemplary embodiment is a process of permission setting. According to the first exemplary embodiment, permission setting is directly performed on the preceding job. However, according to the fourth exemplary embodiment, permission setting is performed based on a user identification for the preceding job. According to the present exemplary embodiment, user information is information which can be arbitrarily added by the user in advance when the first data is generated. The user information is used in identifying the user of the first job.

Figure 35:
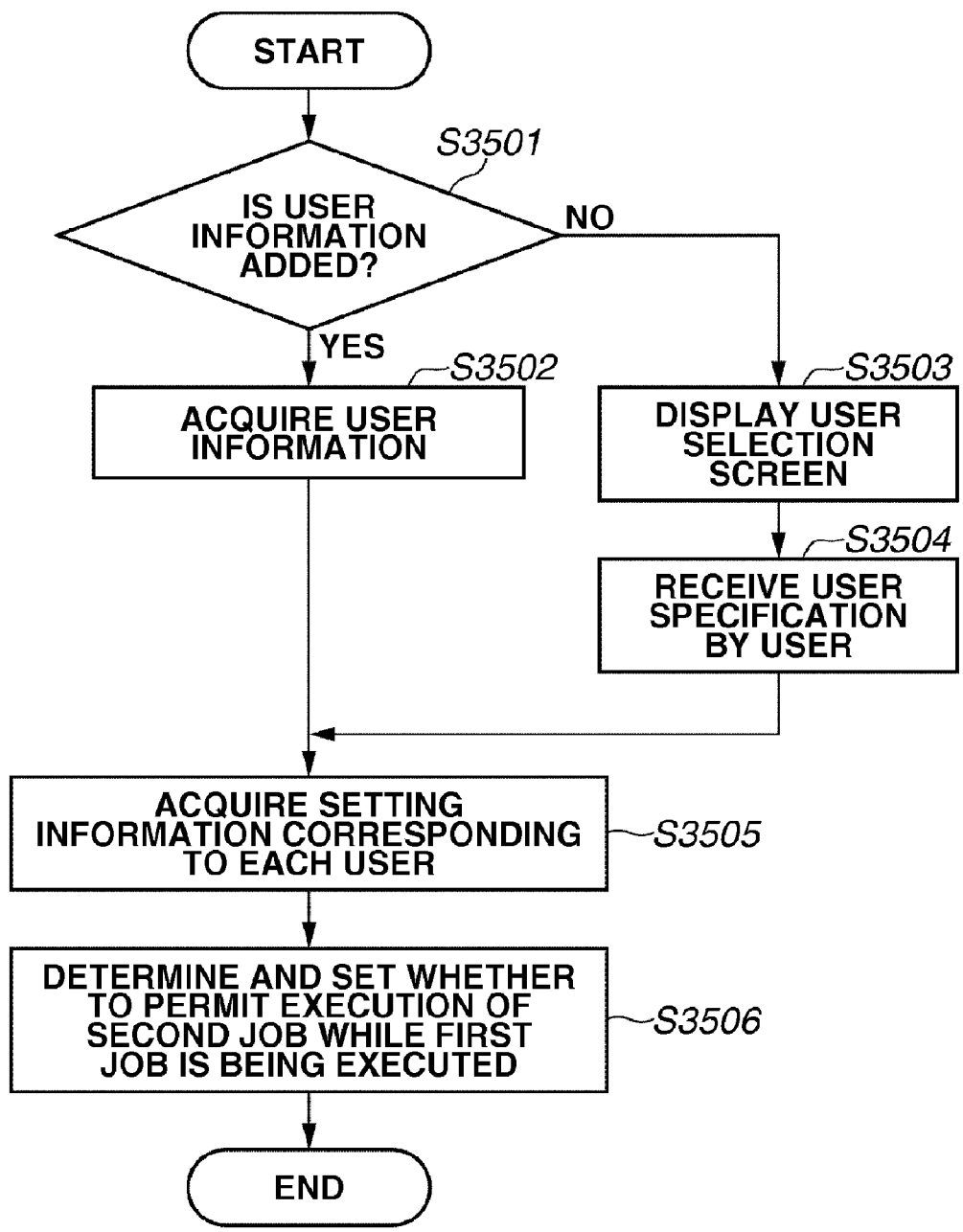
FIG. 35 is a flowchart illustrating a job processing operation (subroutine) of the multifunction peripheral according to a fourth exemplary embodiment of the present invention.

Main routine of the flowchart illustrating a job processing operation of the multifunction peripheral 100 according to the present exemplary embodiment is similar to the one described referring to FIG. 30. FIG. 35 is a flowchart illustrating a subroutine of the permission setting in step S3002 in FIG. 30 according to the present exemplary embodiment. This operation is realized when the CPU 201 reads and executes a program stored in the RAM 202. In step S3501, the CPU 201 determines whether the user information is added to data of the first job. If the CPU 201 determines that the user information is added to the data of the first job (YES in step S3501), the process proceeds to step S3502. If the CPU 201 determines that the user information is not added (NO in step S3502), the process proceeds to step S3503. In step S3502, the CPU 201 acquires the user information of the first job. In step S3503, the CPU 201 displays a screen on the display of the main UI terminal 101 or the auxiliary UI terminal 103. The user can specify a user of the first job using this screen.

Figure 29:
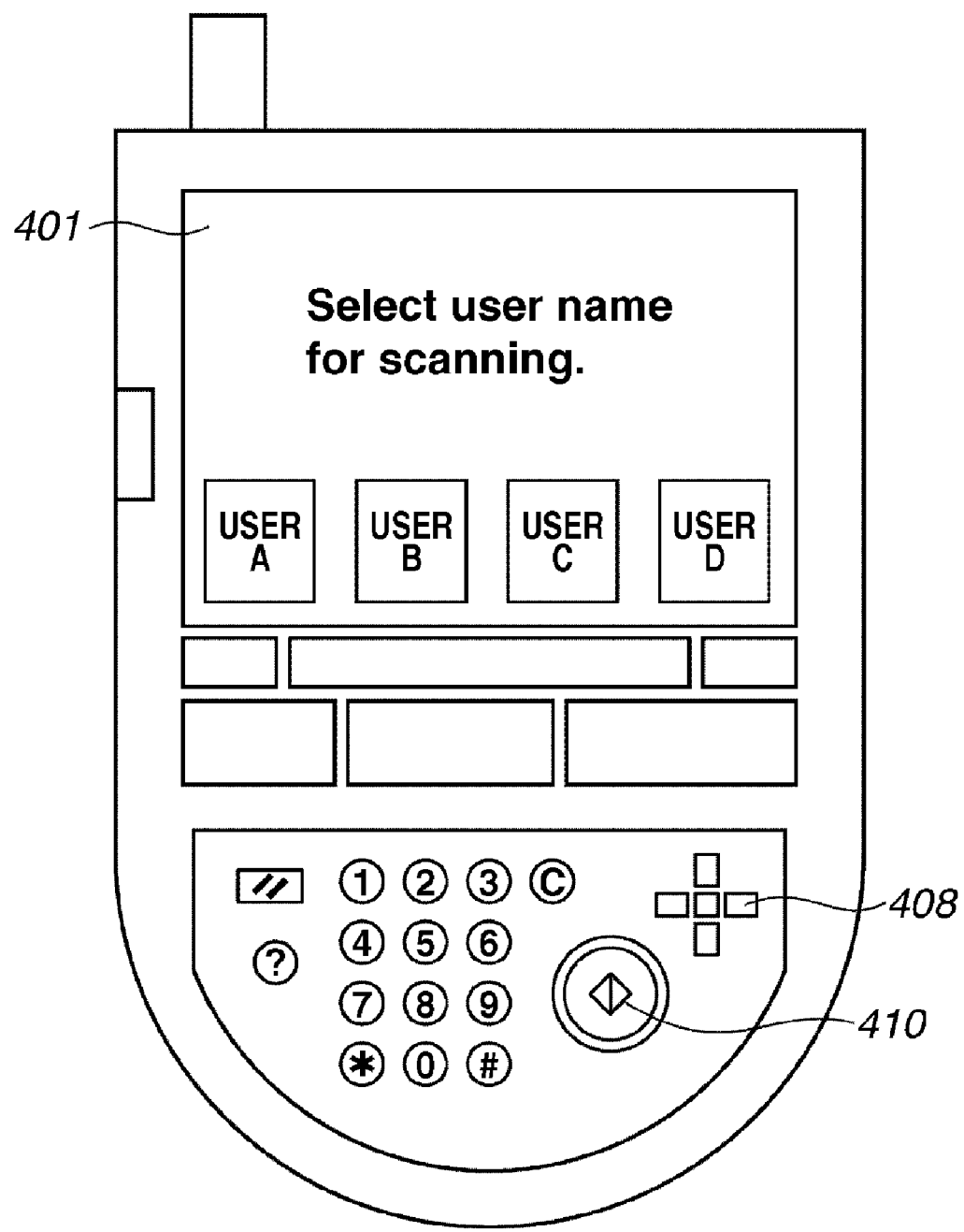
FIG. 29 illustrates an auxiliary UI terminal displaying a screen for setting a user according to a fourth exemplary embodiment of the present invention.
Figure 36:
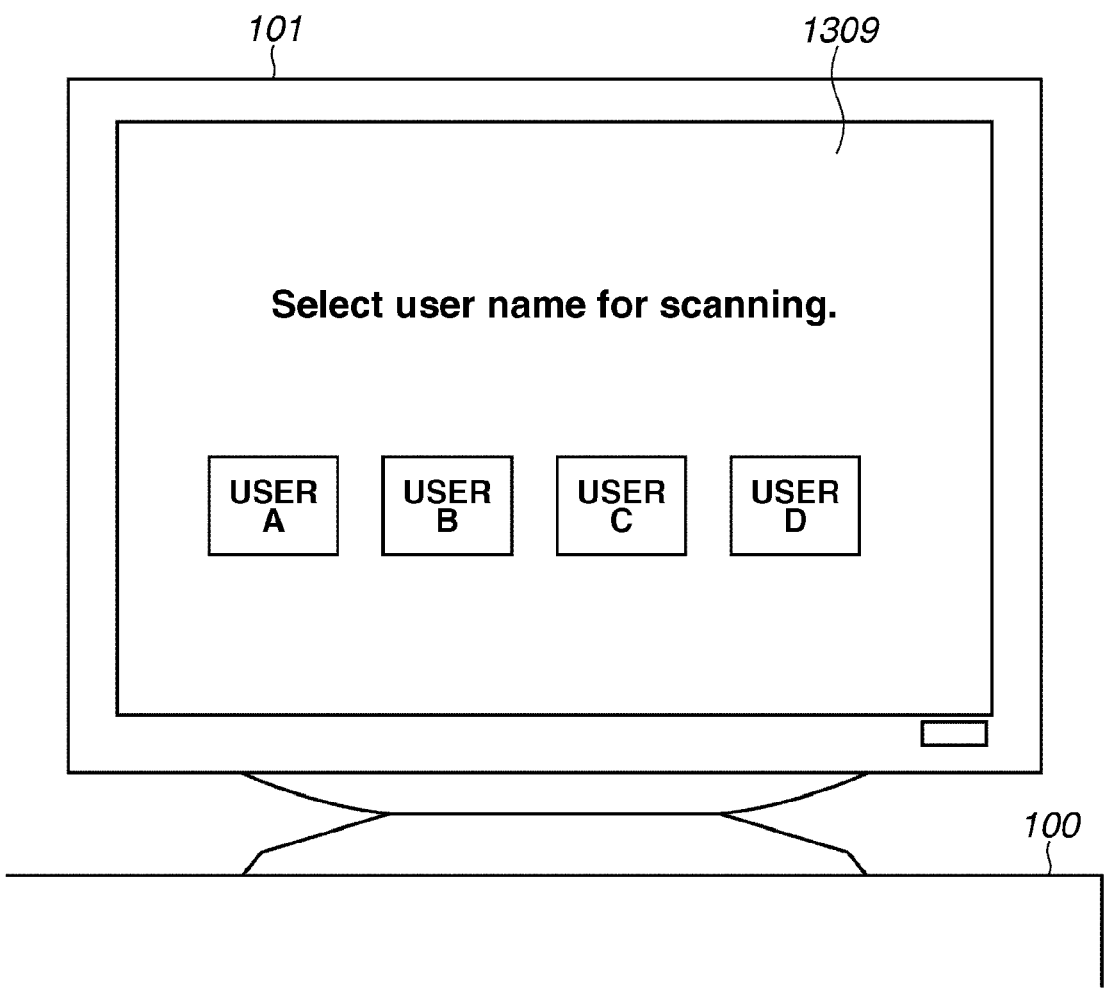
FIG. 36 illustrates a selection screen of the main UI terminal which is used for setting a user according to the fourth exemplary embodiment of the present invention.

FIG. 36 is an example of a screen displayed on the display of the main UI terminal 101 in step S3503. FIG. 29 is an example of a screen displayed on the display of the auxiliary UI terminal 103 in step S3503. In step S3504, the CPU 201 receives specification information on the user of the first job. The user can specify the user of the first job by using, for example, the screen displayed in FIG. 36 or FIG. 29. In step S3505, the CPU 201 reads setting information corresponding to the user from the HD 213 based on the user information acquired in step S3502 or the user specification information received in step S3504.

Figure 37:
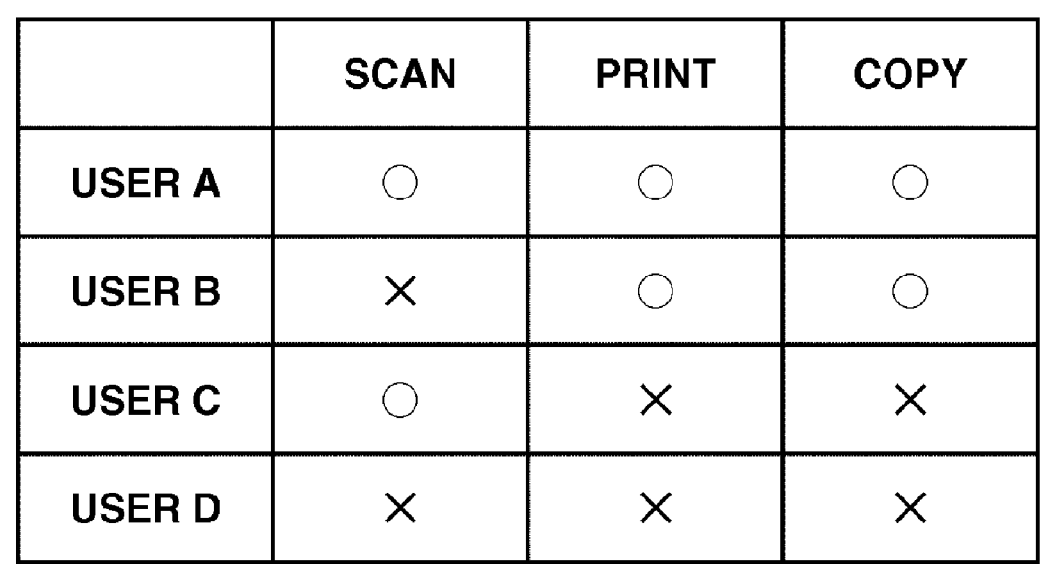

As for the correspondence relationship between users and setting information, a table illustrated in FIG. 37, for example, can be stored in the HD 213 and used accordingly. The table in FIG. 37 illustrates a correspondence relationship between users and permission setting. For example, user A is permitted to execute any second job, regardless of the data of the first job, while the first job is in execution. On the other hand, user B is permitted to execute the second job while the first job is in execution only if the first job is printing or copying. In step S3506, the CPU 201 sets whether to permit execution of the second job while the first job is in execution based on the setting information acquired in step S3505.

According to the above description, control as to whether to permit execution of the second job while the first job is in execution is made based on a setting for the first job. However, this control can also be made on a setting for the second job. In this case, the setting in step S3506 will be made for the second job.

According to the present embodiment, whether to permit execution of a subsequent job while a preceding job is in execution can be set on a multifunction peripheral having both a reading function and a printing function for each job based on the identification of the user for the preceding job.

According to the above-described exemplary embodiments, the hardware service includes a service using execution of printing by the printing unit 206 of the MFP 100 and a service using execution of scanning by the scanner unit 208 of the MFP 100. However, a service other than such services can be included in the hardware service so long as the service can keep exclusive right for one person.

The present invention can also be achieved by providing a storage medium which stores software (program code) for implementing functions of the above-described exemplary embodiments, to a system or an apparatus. The program code stored in the storage medium can be read and executed by a computer (central processing unit (CPU) or micro-processing unit (MPU)) of the system or the apparatus.

In this case, the software (program code) itself realizes the novel functions of the above-described exemplary embodiments. The software (program code) itself and the storage medium which stores the software (program code) constitute the present invention.

A computer executable program to implement the above-mentioned exemplary embodiments can take any form readable by computer, for example, an object code, a program executed by an interpreter, or script data supplied to an operating system (OS).

The storage medium can be, for example, a floppy disk, a hard disk, a MO, a compact disc-read-only memory (CD-ROM), a CD-R, a CD-RW, a magnetic tape, a nonvolatile memory card, a ROM, or a DVD.

Such software (program code) can also be supplied by the system or the apparatus accessing a web page on the Internet through the browser of a client computer. The software (program code) itself or a compressed file including an auto-install function can be downloaded from the web page onto a hard disk. In addition, the program code can be broken up into a plurality of files, and each file can be downloaded from different web pages. Namely, the present invention can be applied to a World Wide Web (WWW) server or a file transfer protocol (FTP) server that allow numerous users to download the program files so that the functions or processes of the present invention can be realized on their computers.

Furthermore, such software (program code) can be encrypted and stored in a storage medium, such as a CD-ROM, to be distributed to users. A user who meets given conditions can download the key information for decrypting the program from a web page through the Internet. By using the key information, the encrypted program can be executed and installed in a computer to realize the functions of the present invention.

Furthermore, the above-described exemplary embodiments can be not only realized by executing software (program code) read by a CPU. An operating system (OS) or the like working on a computer can also perform a part or the whole of processes according to instructions of the software (program code) and realize functions of the above-described exemplary embodiments.

Furthermore, software (program code) read from a storage medium can be stored in a memory equipped in a function expansion board inserted in a computer or a function expansion unit connected to a computer, and a CPU in the function expansion board or the function expansion unit can execute all or a part of the processing based on the instructions of the software (program code) to realize the functions of the above-described exemplary embodiments.

According to an exemplary embodiment of the present invention, an information processing apparatus can acquire device information which is spontaneously transmitted from a peripheral device based on timing information transmitted by the information processing apparatus. Such a process can be performed without increasing traffic between the information processing apparatus and the peripheral device.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-261017 filed Oct. 4, 2007, which is hereby incorporated by reference herein in its entirety.

What is claimed is:

1. An image processing apparatus comprising:
a reading unit configured to input image data by executing reading processing for reading a document;
a printing unit configured to execute print processing based on image data;
a control unit configured to control a reading job for causing the reading unit to execute the reading processing and a printing job for causing the printing unit to execute the print processing;
a setting unit configured to perform setting as to whether to permit execution of a second job while a first job is in execution, the first job being one of the reading job or the printing job, and the second job being the other of the reading job or the printing job,
wherein, when the second job is input while the first job is in execution, the control unit is configured to enable execution of the second job while the first job is in execution if the setting unit performs the setting to permit execution of the second job while the first job is in execution;
a storage unit configured to store information for performing the setting for each user; and
an acquisition unit configured to acquire the information for performing the setting depending on a user from the storage unit,
wherein the setting unit is configured to perform the setting based on the acquired information for performing the setting.

2. The image processing apparatus according to claim 1, wherein the setting unit is configured to perform the setting for the first job and,
wherein the control unit is configured to control the reading job and the printing job based on the setting performed for the first job.

3. The image processing apparatus according to claim 1, wherein the setting unit is configured to perform the setting for the second job, and
wherein the control unit is configured to control the reading job and the printing job based on the setting made for the second job.

4. The image processing apparatus according to claim 1, wherein, if the setting unit performs the setting not to permit execution of the second job while the first job is in execution for at least one of the first job and the second job, the control unit is configured to disable execution of the second job while the first job is in execution.

5. The image processing apparatus according to claim 1, wherein a period during which the first job is in execution is from a start to an end of the reading processing if the first job is the reading job, and from a start to an end of the print processing if the first job is the printing job.

6. The image processing apparatus according to claim 1, wherein the setting unit is configured to perform the setting based on information added to the first job when the first job is generated.

7. The image processing apparatus according to claim 1, wherein the setting unit is configured to perform the setting based on information added to the second job when the second job is generated.

8. The image processing apparatus according to claim 1, further comprising a receiving unit configured to receive information for performing the setting from a user,
wherein the setting unit is configured to perform the setting based on the information received by the receiving unit.

9. The image processing apparatus according to claim 1, wherein the setting unit is configured to perform the setting in response to the second job being input.

10. The image processing apparatus according to claim 1, further comprising an input unit configured to input an execution condition for the reading processing or the print processing,
wherein the setting unit is configured to perform the setting based on information added to the execution condition.

11. The image processing apparatus according to claim 10, wherein the input unit is configured to input the execution condition from an external apparatus connected to the image processing apparatus.

12. The image processing apparatus according to claim 10, wherein the input unit is configured to input the execution condition prior to the first job.

13. The image processing apparatus according to claim 10, wherein the execution condition includes a condition concerning at least one of color, resolution, paper size, and document type used in executing the reading processing if processing corresponding to the first job is the reading processing, and includes a condition concerning at least one of color, resolution, paper size, document type, and finishing type used in executing the print processing if processing corresponding to the first job is the print processing.

14. A method comprising:
inputting image data by executing reading processing for reading a document;
executing print processing based on image data;
controlling a reading job for executing the reading processing and a printing job for executing the print processing;
performing setting as to whether to permit execution of a second job while a first job is in execution, the first job being one of the reading job and the printing job, and the second job being the other of the reading job and the printing job;
when the second job is input while the first job is in execution, enabling execution of the second job while the first job is in execution if the setting is performed to permit execution of the second job while the first job is in execution;
storing information for performing the setting for each user; and
acquiring the information for performing the setting depending on a user from the storage unit,
wherein the setting is performed based on the acquired information.

15. A non-transitory storage medium storing instructions which, when executed by an apparatus, cause the apparatus to perform operations comprising:
inputting image data by executing reading processing for reading a document;
executing print processing based on image data;
controlling a reading job for executing the reading processing and a printing job for executing the print processing;
performing setting as to whether to permit execution of a second job while a first job is in execution, the first job being one of the reading job and the printing job, and the second job being the other of the reading job and the printing job; and
when the second job is input while the first job is in execution, enabling execution of the second job while the first job is in execution if the setting is performed to permit execution of the second job while the first job is in execution.

* * * * *